(12) United States Patent
Bajorek et al.

(10) Patent No.: US 7,119,990 B2
(45) Date of Patent: Oct. 10, 2006

(54) STORAGE DEVICE INCLUDING A CENTER TAPPED WRITE TRANSDUCER

(75) Inventors: Christopher H. Bajorek, Los Gatos, CA (US); Thomas A. O'Dell, San Jose, CA (US)

(73) Assignee: Komag, Inc., San Jose, CA (US)

( * ) Notice: Subject to any disclaimer, the term of this patent is extended or adjusted under 35 U.S.C. 154(b) by 63 days.

(21) Appl. No.: 10/358,075

(22) Filed: Feb. 3, 2003

(65) Prior Publication Data

US 2004/0075940 A1    Apr. 22, 2004

Related U.S. Application Data

(63) Continuation-in-part of application No. 10/158,776, filed on May 30, 2002, now Pat. No. 6,857,937.

(51) Int. Cl.
*G11B 5/41*    (2006.01)

(52) U.S. Cl. ....................................... 360/128
(58) Field of Classification Search ..................... None
See application file for complete search history.

(56) References Cited

U.S. PATENT DOCUMENTS

| | | | |
|---|---|---|---|
| 4,551,772 A | 11/1985 | Sliger | 360/46 |
| 4,816,932 A | 3/1989 | Yates | 360/46 |
| 5,072,324 A * | 12/1991 | Lin et al. | 360/126 |
| 5,142,425 A * | 8/1992 | Gailbreath et al. | 360/123 |
| 5,668,676 A | 9/1997 | Voorman et al. | 360/46 |
| 5,790,336 A | 8/1998 | Voorman et al. | 360/68 |
| 2001/0036028 A1 | 11/2001 | Putnam et al. | 360/46 |

* cited by examiner

*Primary Examiner*—Robert S. Tupper
(74) *Attorney, Agent, or Firm*—Silicon Valley Patent Group LLP

(57) ABSTRACT

A head for use in a drive includes a heating element capable of generating heat sufficient to cause the head to have a shape that is similar or identical to the shape that the head has when performing an operation (e.g. writing) on a recording medium in the drive. The heating element is activated when the operation is not being performed. Hence, a head generates the same amount (or similar amount) of heat and is therefore at the same temperature (also called "operating temperature"), regardless of whether or not an operation (such as writing) is being performed. Therefore, the head maintains a fixed shape or has a shape that varies minimally, within a predetermined range around the fixed shape, that in turn results in maintaining fly height (distance between the head and the recording medium). The heating element may be implemented to use loss mechanisms inherent in a write transducer, e.g. by providing a center tap to the write transducer. When using a center tapped write transducer, currents in phase with one another are provided to perform a write operation. When not performing the write operation, the same currents are provided, but out of phase.

8 Claims, 25 Drawing Sheets

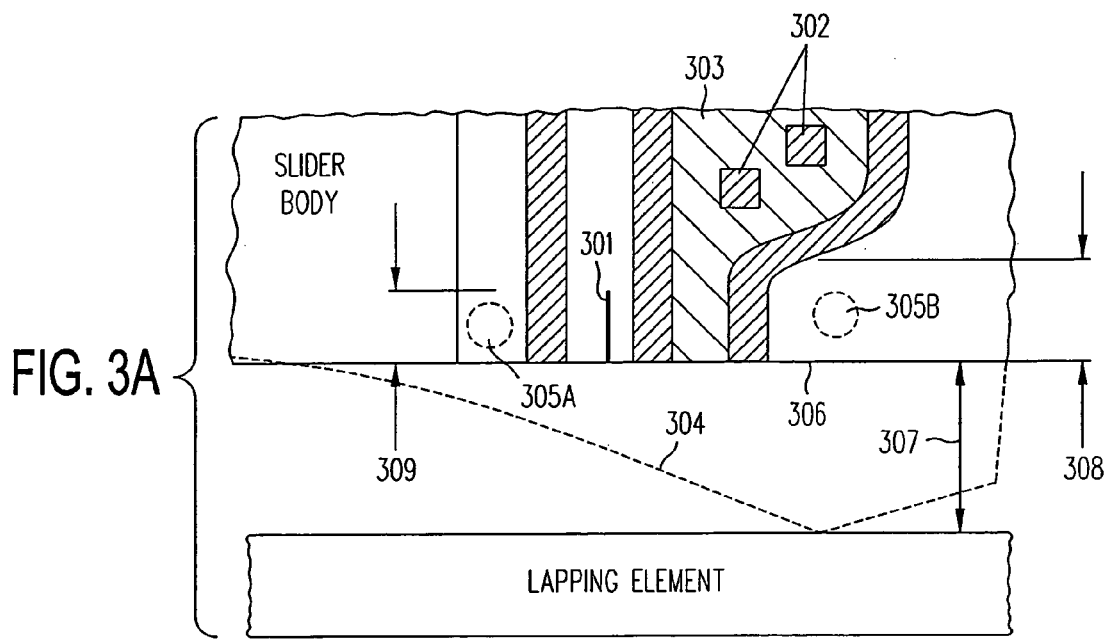
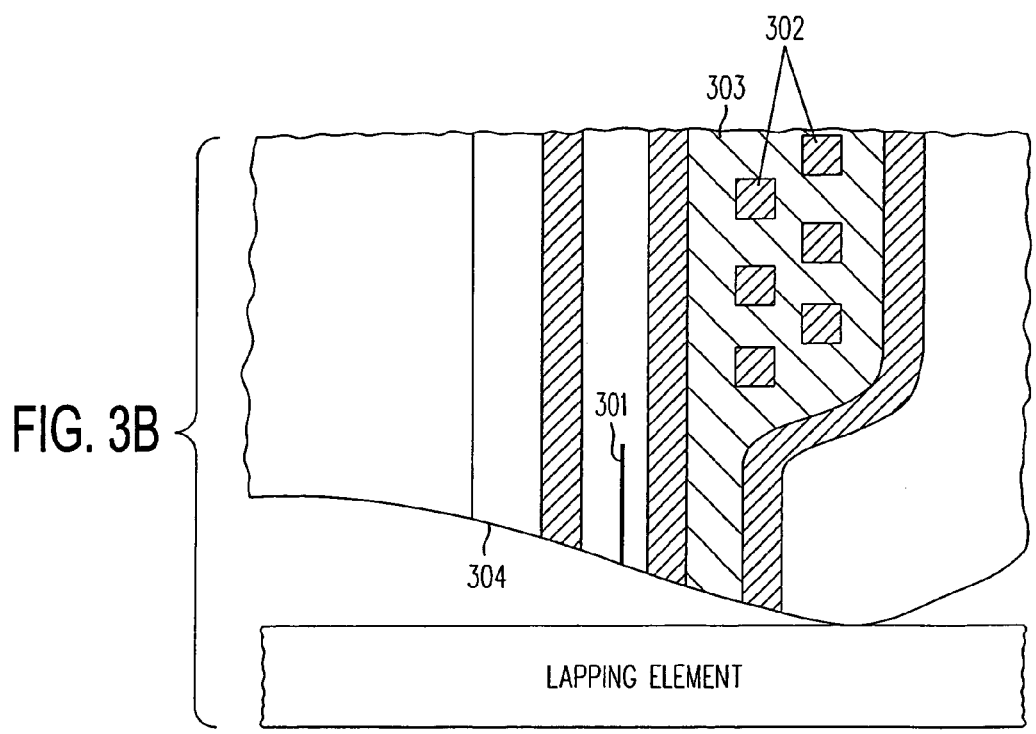

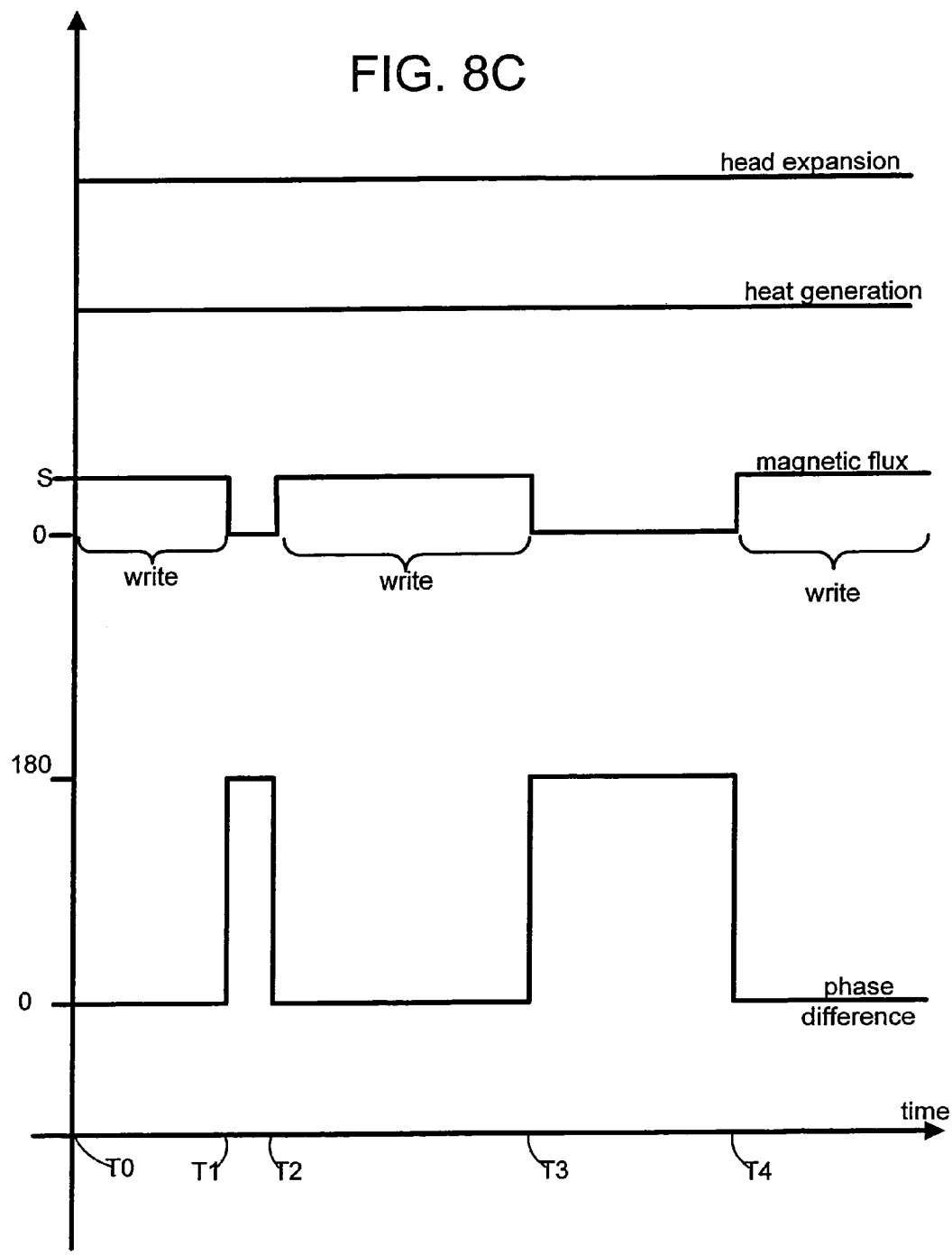

STORAGE DEVICE INCLUDING A CENTER TAPPED WRITE TRANSDUCER

CROSS-REFERENCE TO RELATED APPLICATIONS

This application is a continuation-in-part of, and incorporates by reference herein in its entirety the commonly owned and U.S. Patent Application entitled "LAPPING A HEAD WHILE POWERED UP TO ELIMINATE EXPANSION OF THE HEAD DUE TO HEATING" filed by Christopher H. Bajorek and having the application Ser. No. 10/158,776 and a filing date of May 30, 2002, now U.S. Pat. No. 6,857,937.

BACKGROUND OF THE INVENTION

Expansion of materials at the micrometer scale and nanometer scale is important in data storage devices such as magnetic tape and disk drives. Specifically, such devices contain a small device called a "slider" on which is located a "head". The slider moves relative to a recording medium (such as a tape or disk) during normal operation. The head contains circuitry (called "transducer") to perform the functions of reading from and writing to a recording medium 120. A conventional head 110 (FIG. 1A) includes a microscopic region 111 at which the transducer is located. Head 110 may be either separately fabricated and attached to a slider 130, or integrally formed as a portion of slider 130. Slider 130 is formed primarily of a ceramic material, and head 110 is located at a trailing edge 131 thereof (FIG. 1A). Slider 130 typically has an air bearing surface (ABS) 133 facing the recording medium 120.

In certain disk drives, or tape drives, region 111 is separated from surface 121 (of recording medium 120) during normal operation by a distance called flying height (in a direction perpendicular to surface 121). Typical flying heights are designed to insure appropriate magnetic spacing between the transducer and the medium (e.g. in the range of 40–75 angstroms) and depend on the amount of heat generated in region 111. In region 111, head 110 can be made of heterogeneous materials, which have different thermal coefficients of expansion, and expand by different amounts. Depending on the magnitude of expansion and the location of head 110 relative to slider 130, a portion of the head in and around region 111 may expand (e.g. swell) outward (e.g. by 25 to 120 Angstroms) towards the recording medium 120 as illustrated in FIG. 1B. When the head's surface expands and bulges out (from its normally planar shape when powered down), the fly height is reduced by the amount of this expansion. The reduction in fly height is sufficient to cause the head to come into contact with the medium, resulting in the head itself or the recording medium or both being damaged.

For example, a head-to-disk current surge may occur suddenly when a head comes into close proximity to a disk. When such a current surge happens, read/write circuitry in the head may melt, thereby damaging the head permanently. Damage to the head can also occur by mechanical abrasion, e.g. when a head's protrusion acts as a phonograph needle. Contact of a head with the medium may also affect the drive's servo control (PES, position error signal), resulting in the head becoming unable to track the medium so that data cannot be written or read.

A prior art head may be heated via a resistor as described in U.S. Pat. No. 5,991,113 granted to Meyer, et al. on Nov. 23, 1999, and entitled "Slider with temperature responsive transducer positioning". Specifically, a temperature control circuit, coupled to a strip of thermally expansive material or to a resistance heating element on the slider, employs a variable current source to control the slider temperature and transducer displacement. Nominal slider operating temperatures can be set to achieve a predetermined transducer flying height, to compensate for variations in flying heights among batch fabricated sliders. Optionally, a temperature sensor can be employed to measure slider operating temperatures and provide a temperature sensitive input to the temperature control circuit. U.S. Pat. No. 5,991,113 is incorporated by reference herein in its entirety. Also, a prior art head may have a pole tip recession (PTR), as noted in an application note ("appnote") dated Nov. 8, 2000, entitled "Automated Measurement of Pole Tip Recession with New-Generation Atomic Force Microscopes" available over the Internet at www.veeco.com/pdf/PTRMain.pdf. This appnote states in pertinent part: "Recession is produced during lapping of slider rows during manufacture, when the hard ceramic Al2O3-TiC of the slider's ABS wears less than the softer NiFe pole tips. PTR contributes to the total magnetic spacing between the transducers and the magnetic layer of the disk, and is becoming a more significant portion of that spacing as flying heights shrink. . . . Manufacturers are seeking to reduce the PTR to <5 nanometers, to optimize performance, while maintaining a slight recession to allow for thermal expansion and to prevent damage in the event of contact with the disk."

Lapping of slider rows (also called "strips") is also described in, for example, U.S. Pat. No. 5,095,613 granted to Hussinger et al, U.S. Pat. No. 5,361,547 granted to Church, et al., U.S. Pat. No. 4,914,868 also granted to Church, et al. and U.S. Pat. No. 4,912,883 granted to Chang, et al. each of which is incorporated by reference herein in its entirety. For more information on fabrication of magnetic recording heads, see an article entitled "Materials and Processes for MR and GMR Heads and Assemblies" by Dr. K. Gilleo, N. Kerrick and G. Nichols, available on the Internet at www.cooksonsemi.com/staystik.htm, and this article is incorporated by reference herein in its entirety. Note that instead of lapping a row of sliders, a strip having heads aligned in a column can be lapped, as described in U.S. Pat. No. 5,321,882 granted to Zarouri, et al. on Jun. 21, 1994 that is also incorporated by reference herein in its entirety.

A change in a signal from a resistor or other device (also called "electrical lapping guide") on each head may be monitored during lapping of the head, to determine when to stop lapping, as described in, for example U.S. Pat. No. 4,914,868 (incorporated by reference above), and in the following each of which is incorporated by reference herein in its entirety: U.S. Pat. No. 3,821,815 granted to Abbott et al. (which discloses electrical monitoring of films during material removal), U.S. Pat. No. 3,787,638 granted to Murai (which discloses a Hall element with one or more leads used during head manufacture to measure the amount of material being ground away), U.S. Pat. No. 4,675,986 granted to Yen (which discloses electrical lapping devices having graded resistance), U.S. Pat. No. 5,175,938 granted to Smith (which teaches combining different types of graded resistors), and U.S. Pat. No. 5,065,483 granted to Zammit (which teaches comparing a resistive lapping guide with a finished lapping guide).

U.S. Pat. No. 5,632,669 granted to Azarian, et al. on May 27, 1997, and entitled "Interactive method for lapping transducers" describes a lapping body that communicates with a transducer with a type of signal that the transducer is designed to read and/or write. Thus for lapping a magnetic head or slider to be employed in a hard disk drive, the lapping body contains a magnetic medium layer that is either prerecorded or written by the head during lapping, while the signal received by the head is monitored and analyzed by a processor in order to determine, in part, when to terminate lapping. A series of transducers can be simultaneously lapped while individually monitored, so that each transducer can be removed from the lapping body individually upon receipt of a signal indicating that transducer has been lapped an optimal amount. Transducers for employment in drive systems can also be tested for performance characteristics by utilizing lapping bodies having surface characteristics similar to those found in the drive system. U.S. Pat. No. 5,632,669 is also incorporated by reference herein in its entirety.

SUMMARY OF THE INVENTION

A head for use in a drive in accordance with the invention includes a heating element capable of generating heat sufficient to cause the head to have a shape that is similar or identical to the shape that the head has when performing an operation (e.g. writing) on a recording medium in the drive. The heating element is activated in accordance with the invention when the operation is not being performed. Hence, in some embodiments of the invention, a head generates the same amount (or similar amount) of heat and is therefore at the same temperature (also called "operating temperature"), regardless of whether or not an operation (such as writing) is being performed. Therefore, the head maintains a fixed shape or has a shape that varies minimally, within a predetermined range around the fixed shape, that in turn results in maintaining fly height (distance between the head and the recording medium).

In certain embodiments, a heating element of the type described above may be implemented by the use of loss mechanisms that are inherent in (i.e. native to) the circuitry (also called "transducer") that is normally used in an operation on the recording medium, although in other embodiments the heating element is formed as a separate element that is electrically isolated from the transducer.

Specifically, in one embodiment, the heating element uses one or more loss mechanisms inherent in the write transducer (e.g. resistance, eddy current effects, and hysteresis losses due to switching the magnetic state of the yoke) by inserting a center tap. In some embodiments, a head with such a write transducer has three terminals (a central terminal and two end terminals). In another embodiment a head with such a write transducer has four or more terminals, which connect to the conductors in the write transducer. For example, instead of two halves of a single center tapped coil, a write transducer may be formed by two coils in which case four terminals are required. Furthermore, some embodiments may have a head with a four terminal read-write transducer. In several embodiments of such heads, all terminals of the head are connected to a preamplifier.

When performing a write operation with such a head, the preamplifier causes currents in two halves of the write transducer to be in phase, i.e. flow in the same direction (e.g. from an end terminal to the center terminal or vice versa depending on the phase). Hence, during the write operation, magnetic fields generated by the two currents add to each other to generate a signal having a strength sufficient for recordation by the recording medium. The data are recorded in the recording medium in the normal manner.

When a write operation is not being performed, the preamplifier causes currents in the two halves of the write transducer to be out of phase, i.e. flow in opposite directions (e.g. one current flows from the terminal to the ground while the other current flows from the ground to the terminal), and thereby causes their respective magnetic fields to cancel each other.

Hence even when a write operation is not being performed, the preamplifier supplies same (or similar) amounts of currents to the write transducer. Therefore the write transducer generates the same amount of heat, regardless of whether or not a write operation is being performed. Hence the head has the same shape and therefore the same fly height regardless of whether or not a write operation is being performed.

In certain embodiments, the head also includes at least one dummy element that is electrically isolated from the read transducer and also electrically isolated from the write transducer. The dummy element is used to generate heat in an amount similar or identical to the heat generated by the read transducer. In several embodiments, such a dummy element is formed by photolithography simultaneously with the read-transducer and with the write transducer.

BRIEF DESCRIPTION OF THE DRAWINGS

FIGS. 3A–3D illustrate, in side views, change in shape of a head during lapping of the type illustrated in FIGS. 2A and 2B.

FIG. 8C illustrates, in a graph, the change phase difference between the currents supplied by the preamplifier, as a function of time in one exemplary usage of the center-tapped write transducer illustrated in FIGS. 8A and 8B.

In several of the drawings, the dimensions are not to scale. Specifically, vertical shrinkage or expansion are shown highly exaggerated relative to the horizontal dimensions to illustrate certain aspects of the invention. For example, in FIGS. 3A–3D, FIGS. 4A and 4B, the x axis scale is shown a few orders of magnitude (e.g. 10,000 times) smaller than the y axis scale

DETAILED DESCRIPTION

Figure 1A:
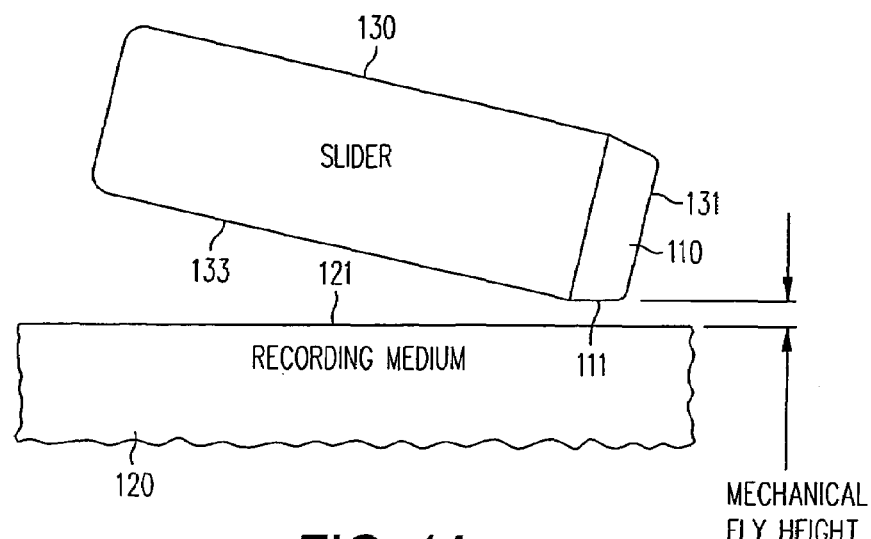
FIGS. 1A and 1B illustrate, in a side view, a prior art drive including a head and a recording medium, prior to and subsequent to power up of the head.
Figure 1B:
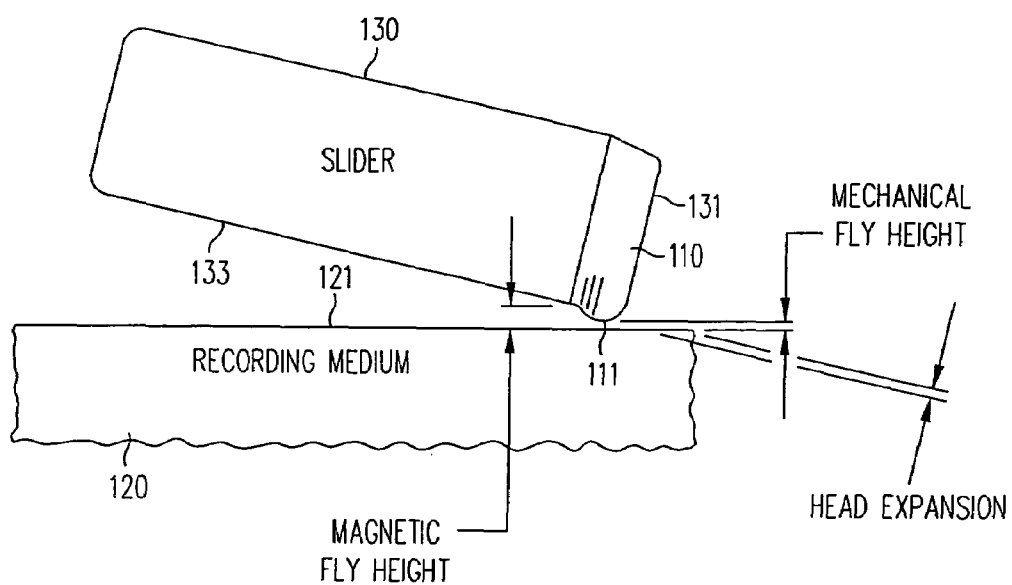
Figure 2A:
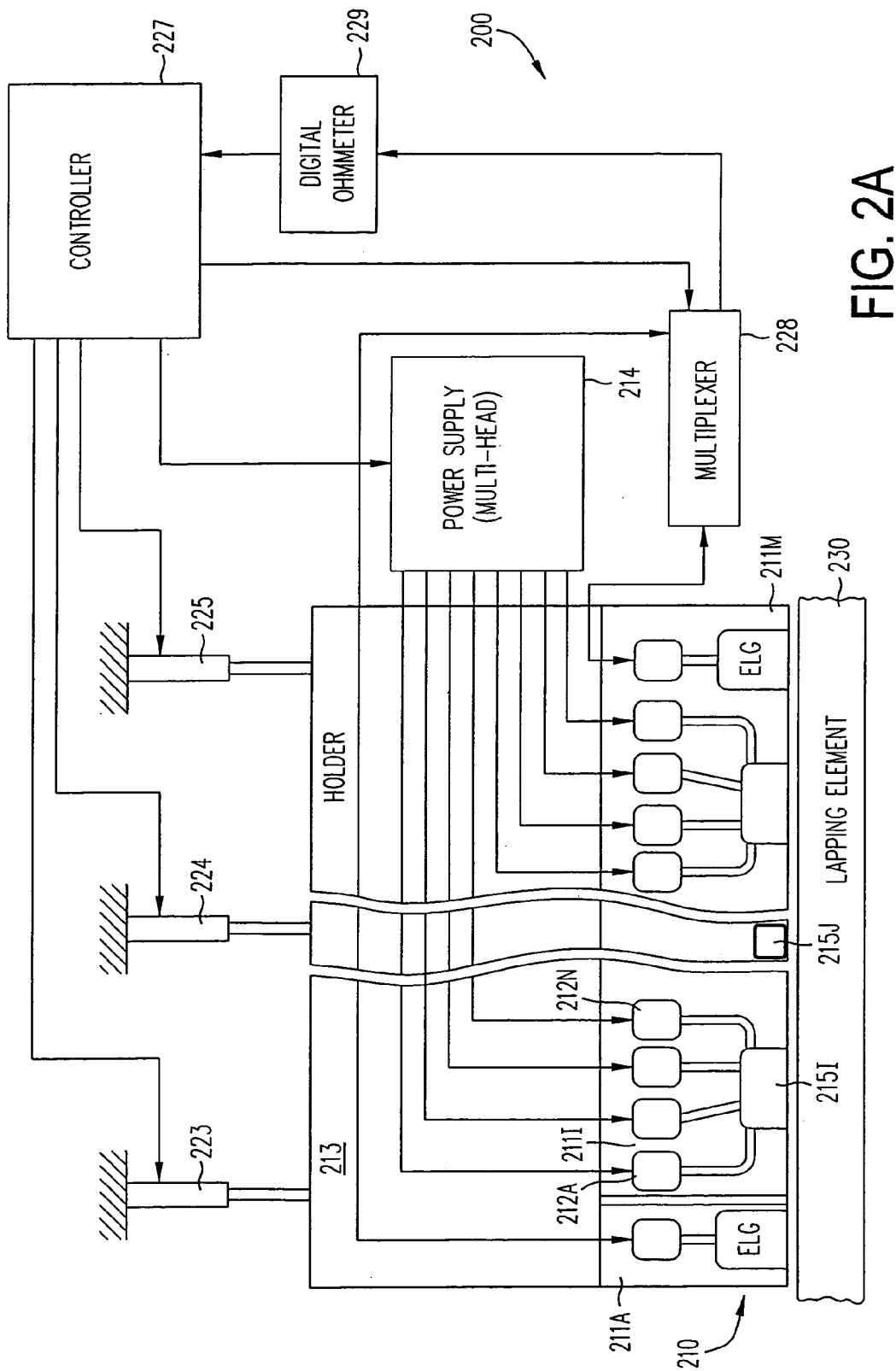
FIGS. 2A and 2B illustrate, in a block diagram and a flow chart respectively, lapping of a strip of heads while being powered up in accordance with the invention.

In one embodiment, a head 211I (FIG. 2A) for a drive (such as a tape drive or a disk drive) is manufactured by photolithography (as per act 251 in FIG. 2B) to have formed thereon a transducer 215I (FIG. 2A) coupled to a number of terminals 212A–212N (FIG. 2A). Depending on the implementation, the photolithography can take 50–100 steps. Transducer 215I may include a magnetoresistive (MR) read element 301 (see FIG. 3A), and optionally a thin film inductive write element and/or copper coils 302 (FIG. 3A). Copper coils 302 are coiled around pole pieces in any manner well known in the art.

Although certain specific features of one particular example of a head 211I are described herein, any type of head can be powered up during lapping as described herein. Examples of head that can be powered up include Magneto Resistive (MR), Giant Magneto Resistive (GMR), Tunnel Magneto Resistive (TMR), and Current Perpendicular to Plane Magneto Resistive (CPPMR).

Depending on the embodiment, one or more electrical lapping guides are formed at the same time that transducer 215I (FIG. 2A) is formed, i.e. during photolithography. For example, one electrical lapping guide (ELG) may be deposited at each end of the row of transducers. The electrical lapping guides are used to control lapping (as discussed below).

Head 211I is just one of a large number of heads (e.g. 10,000 heads) that are manufactured on a wafer 250 (FIG. 2C), and depending on the embodiment, the wafer may be cut into strips, with each strip 251 representing a row (or column) of wafer 250. Each strip 210 includes a number of heads 211A–211M that are located side by side, one after another in a successive manner.

After photolithography, head 211I (which may still be part of a strip 210 as shown in FIG. 2A) is fastened to a holder 213 (as per act 252 in FIG. 2B), and holder 213 to facilitate precise process handling. Holder 213 in turn is mounted in system 200 (FIG. 2A), opposite to a lapping element 230 which performs lapping: removes and polishes material on head 211I to create an air bearing surface (ABS). Specifically, in the exemplary system 200 illustrated in FIG. 2A, actuators 223–225 push holder 213 and head 211I against lapping element 230, although other mechanisms may be used in other embodiments.

Lapping element 230 has an abrasive surface, which due to motion relative to head 211I while pressure is applied by actuators 223–225, removes material from an air bearing surface of head 211I. In this manner, head 211I is lapped, to remove material therefrom, such that the throat height 308 and/or the stripe height 309 of a MR read transducer in head 211I is precisely located relative to the air bearing surface. Lapping element 230 can be, for example, a disk, a drum or a tape, depending on the implementation.

Figure 2B:
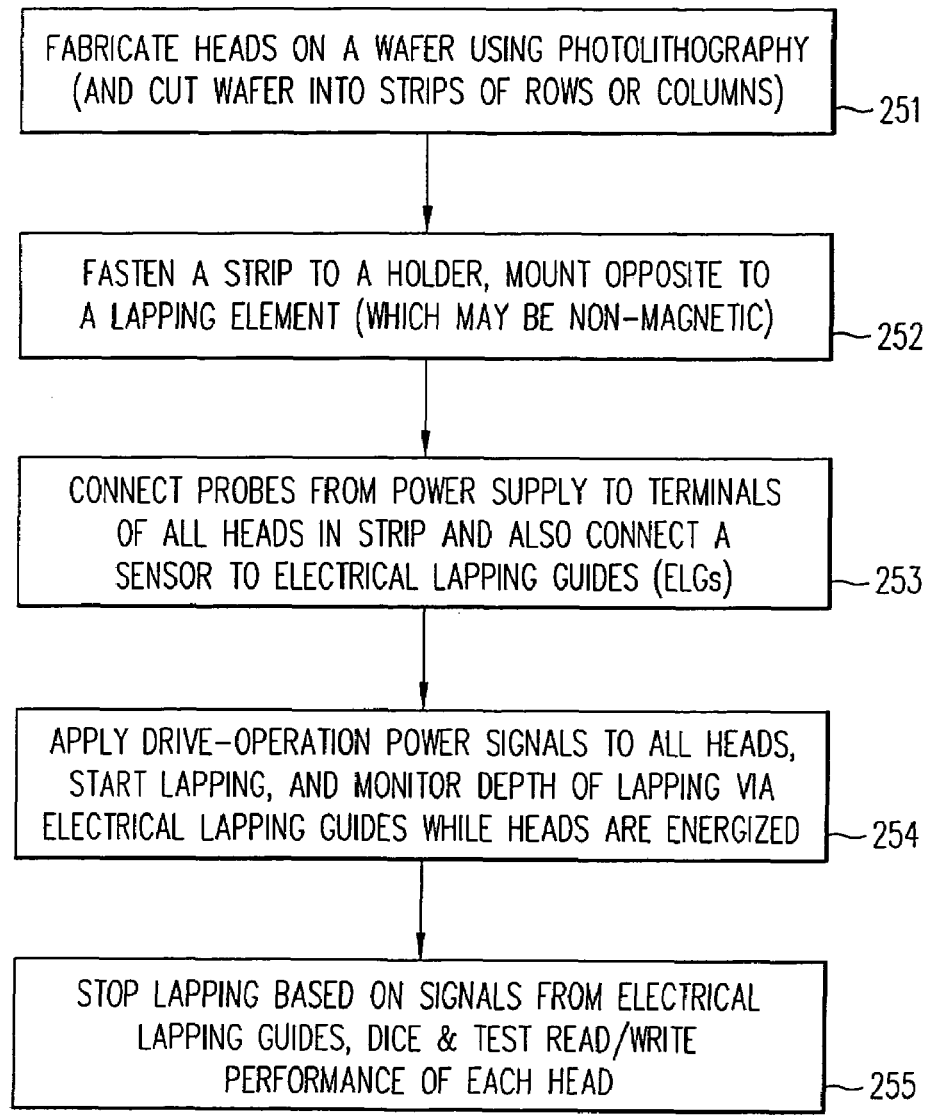
Figure 2C:
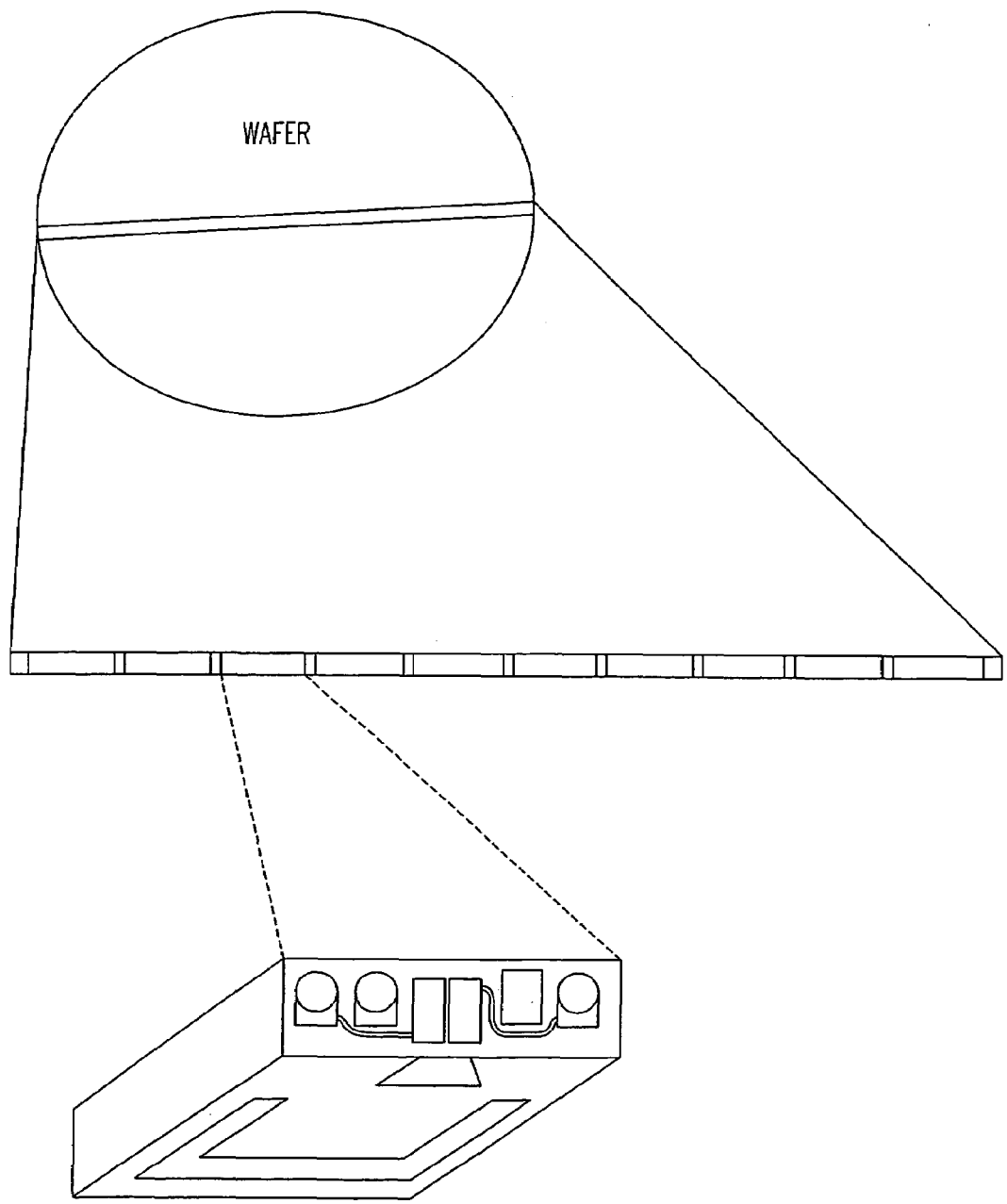
FIG. 2C illustrates a strip of heads in an elevation view and a single head in a perspective view, manufactured by photolithography before being lapped as illustrated in FIGS. 2A and 2B.

At some point prior to (or even during) the lapping process, terminals 212A–212N are connected to a power supply 214 that supplies power thereto (as per act 253 in FIG. 2B). The amount and type of power supplied by power supply 214 (as per act 254) is similar (and preferably identical) to the power used by head 211I during normal operation in a drive. The power supplied may include, for example, a current $I_{write}$ that is normally applied for writing data to a recording medium and/or another current $I_{read}$ that is normally applied for reading data from the recording medium. The heads are lapped and the depth of lapping is monitored via electrical lapping guids while the heads are energized (as per act 254). The lapping is stopped based on signals from the electrical lapping guides (as per act 255), followed by dicing and testing the read/write performance of each head.

The amount and type of power Pp that is applied by power supply 214 to each terminal of a head during the fabrication in a production environment is predetermined (prior to fabrication), based on operating conditions of the drive in which the head is to be mounted. Specifically, during lapping, at least two different high-frequency currents $I_{read}$ and $I_{write}$ are applied to two terminals of head 211I, to ensure that heat generated during normal operation when mounted in a drive is also generated when head 211I is powered up during lapping. The current $I_{read}$ dissipates power into head 211I during reading which is proportional to $I_{read}^2 R_{read}$, where $R_{read}$ is the resistance of the magneto-resistor read element. And similarly, current $I_{write}$ dissipates power into head 211I during writing which is proportional to $I_{write}^2 R_{write}$, where $R_{write}$ is the resistance of the copper coil.

Therefore, each of the read transducer and the write transducer in a head of the type described herein has a complex impedance Z which includes a "real" component and an "imaginary" component. The real component of Z models a portion of the transducer that dissipates heat (hereinafter "dissipative portion") and the imaginary component of Z models a reactive portion (which does not dissipate heat). During lapping of a head, it is only necessary to recreate the expansion of the head due to heat dissipation.

Specifically, in some embodiments, only the write transducer (e.g. copper coils 302 that are coiled around pole pieces) are powered up, while in other embodiments only the read transducer (e.g. the MR element) is powered up. Moreover, in certain embodiments, only direct current (DC) is applied to either (or both) of the two transducers, while in other embodiments only time-varying current (i.e. having a magnitude that varies with time and that can be decomposed into one or more periodic waveforms) is applied to either (or both) of the two transducers. The DC current that is applied may be greater than or equal to the root mean square (rms) value of the power that is applied during normal operation in a drive. Instead of or in addition to power applied to the two transducers, power (either DC or time-varying current) may be applied to circuitry (hereinafter "dummy" element) that is inactive during normal operation in a drive (which may be either a disk drive or a tape drive).

Depending on the embodiment, one or more dummy elements 305A and 305B (FIG. 3A) may be included in a head of the type described herein, solely to power up the head during lapping. The location and rating of elements 305A and/or 305B, as well as the power applied thereto may be designed in certain embodiments to replicate the shape of the head during normal operation in a drive. Note that dummy elements 305A and 305B may be used in combination with one or more transducers, e.g. element 305A may be powered up with the write transducer during lapping, thereby to reduce or even eliminate the power applied to the read transducer during lapping (which may be damaged when powered up to normal operation level current).

Several exemplary embodiments the power applied to a head during lapping are described in the following table, which is not an exhaustive list but merely exemplary.

| Rating | Read Current | Write Current | Advantage/Disadvantage |
|---|---|---|---|
| Theoretically best | AC waveforms | AC waveforms | Risk of damaging read element when energized to normal operational level if current flows to lapping element |
| Equivalent to above | DC equivalent to AC | AC waveforms | Same risk as above |
| Equivalent to above | AC waveforms | DC equivalent to AC | Same risk as above |
| Equivalent to above | DC equivalent to AC | DC equivalent to AC | Same risk as above |
| Next best to above | No power | AC waveforms | No risk of damage to read element; negligible difference in thermal expansion of head |
| Next best to above | No power | DC equivalent to AC | No risk of damage to read element; negligible difference in thermal expansion of head |
| Next best to above | No power | No power | Power up dummy element; no risk; thermal expansion may differ depending on dummy element design, location and power |
| Next best to above | DC or AC waveforms | No power | Risk of damaging read element |

In certain embodiments, both currents $I_{read}$ and $I_{write}$ (that are used in normal operation in a drive) are applied to head 211I during lapping, because during normal operation there may be an overlap in the read and write operations, e.g. if there is a read immediately after a write, in which case both currents will be present. In addition, heat generated by eddy currents may be identified as a function f of these two currents: $f(I_{write}+I_{read}) R_{eddy}$. So, there are three sources of heat during normal operation, and each of these three sources also generate power P during lapping in one specific embodiment, same as in the normal manner of operation in a drive:

$$P = I_{read}^2 R_{read} + I_{write}^2 R_{write} + f(I_{write}+I_{read})R_{eddy}.$$

Figure 3C:
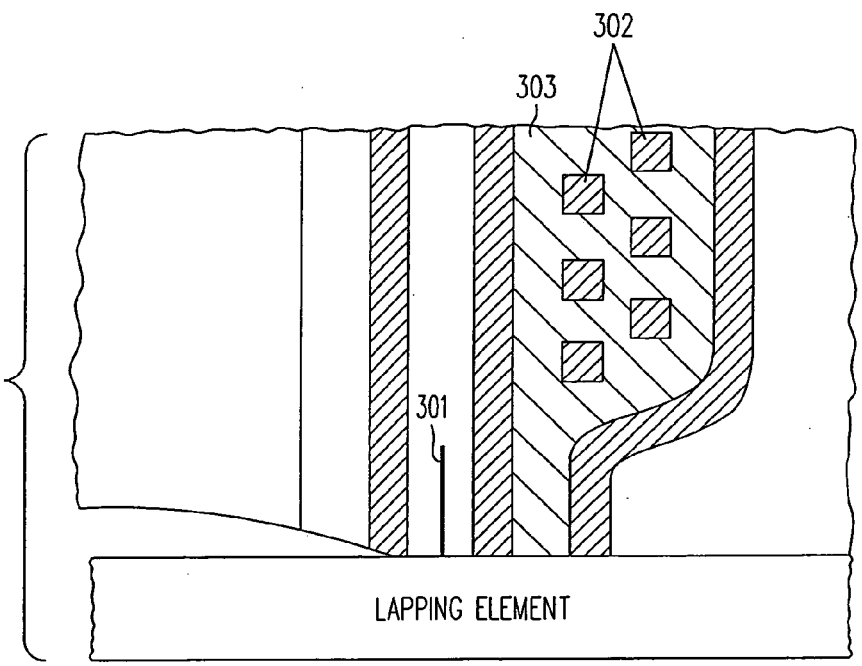
Figure 3D:
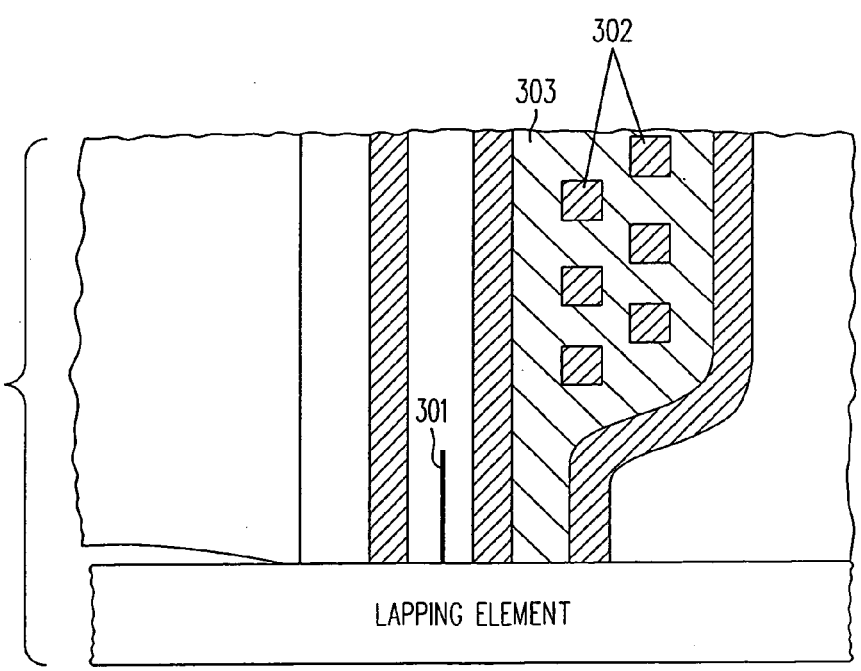

When energized in this manner, a shape 304 (FIG. 3A) that head 211I would have during normal operation when installed in a drive is replicated (or approximated), including expansion by a distance 307 at a location that is adjacent to (but slightly offset from) the pole tip region. The respective shapes 306 and 307 prior to and subsequent to power up are illustrated in FIGS. 3A and 3B. Next, the head's expansion (by distance 307 as shown in FIG. 3A) is either partially (FIG. 3C) or completely removed (FIG. 3D), by lapping while head 211I is kept energized.

Note that lapping by system 200 is performed under the same conditions or similar conditions as operation of a head in a drive. For example, if the expected disk operating temperatures is about 55 degrees centigrade, then system 200 is also operated at this temperature. Alternatively, the amount of power applied to each head 211I may be increased (beyond the power used in normal operation in a drive) to raise the temperature thereof to the operating temperature in a disk drive.

Therefore, a head is purposely kept powered up during material removal in accordance with the invention, so that the head's expansion is planarized. The depth of total material removal from head 211I to achieve a specific MR read element height or write element throat height is monitored in the conventional manner in some embodiments e.g. by a controller 227 that is sensitive to a change in electrical characteristic (such as resistance) of one or more electrical lapping guides (ELGs) that are coupled via a multiplexer 228 to a sensor 229. Sensor 229 can be, for example, an ohm-meter that supplies an electrical signal to controller 227, indicative of an electrical characteristic (e.g. resistance) of one of the electrical lapping guides (ELGs). In several such embodiments, the ELG is not used to monitor removal of head expansion.

Controller 227 selects an ELG by driving an appropriate control signal to multiplexer 228, e.g. in a time-division-multiplexed manner, as would be apparent to the skilled artisan. In one embodiment, controller 227 uses different values of a signal from sensor 229 to control actuators 223–225 to keep the strip 210 level, by varying the pressure applied by each actuator. Therefore, by controlling the individual actuators, a bow condition of a strip can be corrected, in the conventional manner.

As noted above, electrical lapping guides (ELGs) on a strip 210 are fabricated simultaneously with fabrication of transducers 215I and 215J, during photolithography. Depending on the embodiment, strip 210 may have one electrical lapping guide (ELG) for each transducer (located adjacent thereto, between two successive transducers), or alternatively just two electrical lapping guides (ELGS) may be formed at the two ends of a row of transducers. Depending on the embodiment, ELGs may be used for stopping both rough lapping and fine lapping or just one of these.

In several embodiments, although energized, head 211I is not used for reading or writing during the lapping process, and lapping element 230 does not contain a magnetic material. This is contrary to the teachings of U.S. Pat. No. 5,632,669 granted to Azarian, et al. Head 211I is tested for its read/write efficacy only after the lapping process has been completed.

Completion of the lapping process is determined in any conventional manner (e.g. via ELGs). For example, a background resistance within head 211I can be monitored during lapping, by energizing the read element, and measuring a signal from the read element. The measured signal is monitored to detect a change in background resistance within head 211I. Therefore, the signal measured during lapping is unrelated to the readback signal from a disk (as described in U.S. Pat. No. 5,632,669). Instead a change in the measured signal is due to a change in the electrical characteristic of the MR element itself.

In some embodiments, as soon as (or shortly before) lapping of head 211I is to be stopped (e.g. as indicated by a change in resistance of a corresponding electrical lapping guide), only this head 211I is powered down. On being powered down, this head 211I cools (relative to the remaining heads), and its pole tip region starts contracting, thereby to stop or reduce the lapping effect, while the remaining heads (that are still powered up) continue to be lapped. Powering down of a head 211I to stop the lapping effect can be instead of or in addition to controller 227 controlling an appropriate one of actuators 223–225 to stop applying pressure. Eventually, when all heads 211A–211M have been lapped, the entire strip 210 is withdrawn from lapping element 230, and all heads are powered down.

In certain embodiments, after completion of the lapping process, strip 210 is powered down, and any remaining process operations that are normally performed in the fabrication of a head are performed, in the normal manner. For example, a protective layer (of carbon in several embodiments) may be coated to ensure protection from corrosion or abrasion of circuit elements that have exposed regions, and/or from the medium or from harsh environmental conditions, followed by creation of air bearing structures, such as a self regulating surface of the type well known in the art. Depending on the embodiment, various structures that inhibit stiction (such as protrusions or pads) may also be formed on each head (e.g. of strip 210). Thereafter strip 210 is diced (if not already previously diced).

Figure 4A:
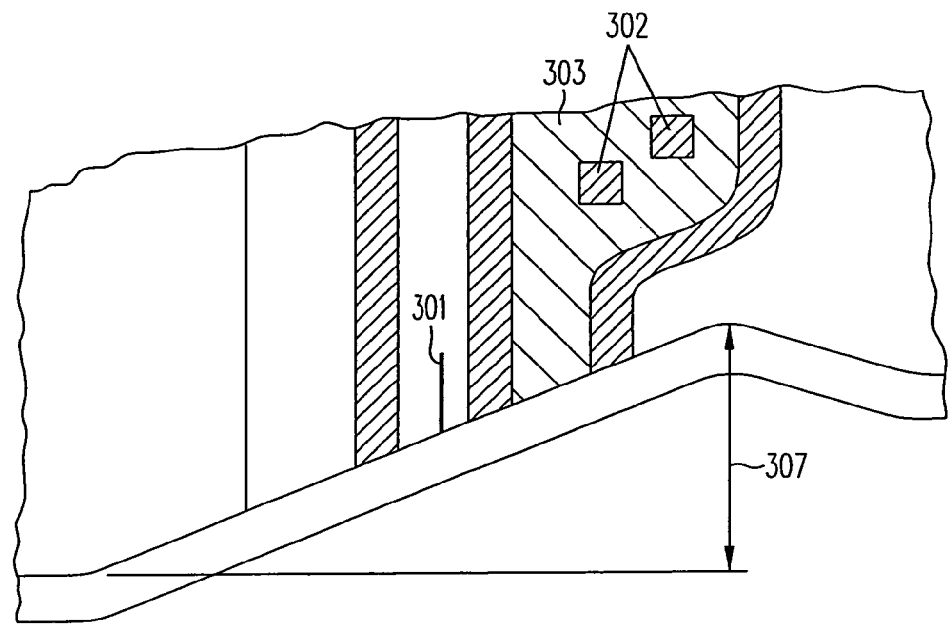
FIGS. 4A and 4B illustrate, in side views, change in shape of a expansion-planarized head prior to and subsequent to being powered up.
Figure 4B:
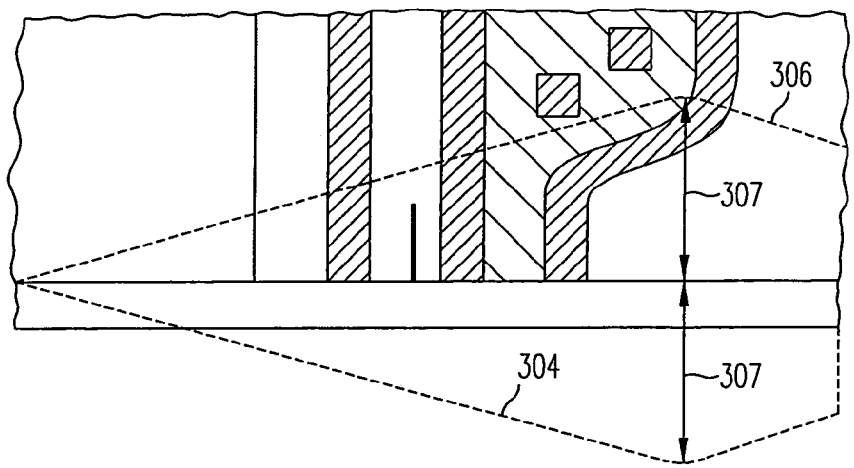

After being powered down and on being cooled to room temperature, head 211I has a concave shape (FIG. 4A) in the pole tip region that is inverse of (i.e. a mirror image of) the convex shape of a head's expansion. Specifically, the concavity defines a volume that would have been occupied by material that forms the head expansion, and that has been removed by lapping. Thereafter, whenever head 211I is powered up in future, the pole tip region becomes substantially flat and in-line with an air bearing surface which is identical to the shape of head 211I on completion of the lapping process (FIG. 4B).

The specific profile of the air bearing surface of head 211I (when powered up in a drive) may be other than flat, depending on the embodiment. For example, even when designed to be flat, manufacturing tolerances result in heads that fall within a range around the flat surface. Consequently, heads resulting from the fabrication that are in the middle of the range may have a flat surface, while other heads at one end of the range have a convex surface and still other heads at the other end of the range have a concave surface. In certain embodiments, the entire range is moved outward (made more convex) so that most (or almost all heads) have a convex surface. In some such embodiments, the power applied to the heads during lapping is selected to ensure that the maximum expansion of heads is less convex than for heads that are lapped without being powered up during lapping.

Figure 4C:
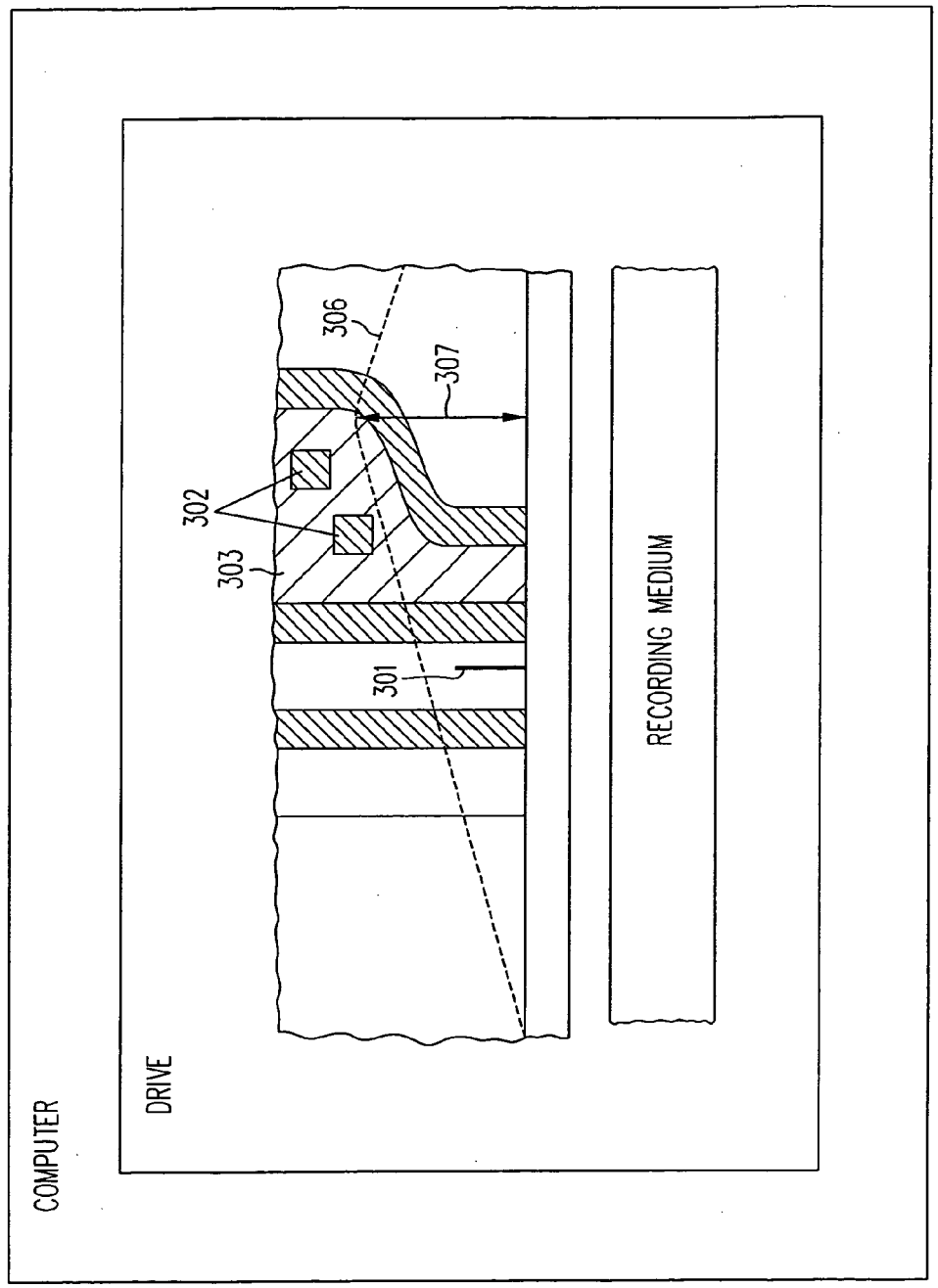
FIG. 4C illustrates use of the expansion-planarized head of FIG. 4B to write and read signals from a recording medium when installed in a drive in a computer.

After lapping, head 211I is mounted in a head gimbal assembly (HGA) and tested in the normal manner (as indicated by act 255 in FIG. 2B). The testing may be for efficacy of reading and writing, and any conventional methods may be used to determine e.g. overwrite, bit-shift, and signal to noise ratio. If head 211I fails conventional testing, then head 211I is discarded, and alternatively if it passes then head 211I is mounted in a head arm assembly (HAA) for use in a drive (for example disk drive) as illustrated in FIG. 4C. Depending on the embodiment, head 211I may (after passing the tests) be used in a tape drive instead of a disk drive. In certain embodiments, head 211I is mounted in a storage device for use with a recording medium, and the storage device (such as a drive) itself is mounted in a computer (as per FIG. 4C). Note that in several embodiments, head 211I has a concave surface 306 (FIG. 4C), and when it expands due to heating the resulting fly height is smaller than prior art fly heights (which may be constrained by a prior art head's expansion from a substantially flat surface to a bulging surface similar to surface 304 shown in FIG. 4B).

One distinction over U.S. Pat. No. 5,632,669 is that in certain embodiments, a number of heads 211A–211M (wherein A≦I≦M, and M is the total number of heads in strip 210, e.g. 100 heads) while still being integral portions of a strip are lapped together as a group, while being powered up. Lapping an entire strip of heads (as a group) provides manufacturing efficiency and economies of scale of the type not possible in lapping each head individually. Furthermore, "strip lapping" embodiments of the type just described are backward compatible, in the sense that pre-existing systems and methods that are currently in use for non-energized strips can still be used in accordance with the invention with the following modifications: installing a power supply, connecting the power supply to all terminals of each head in the strip, and providing power thereto. In contrast the method disclosed by U.S. Pat. No. 5,632,669 requires new tooling.

Figure 5A:
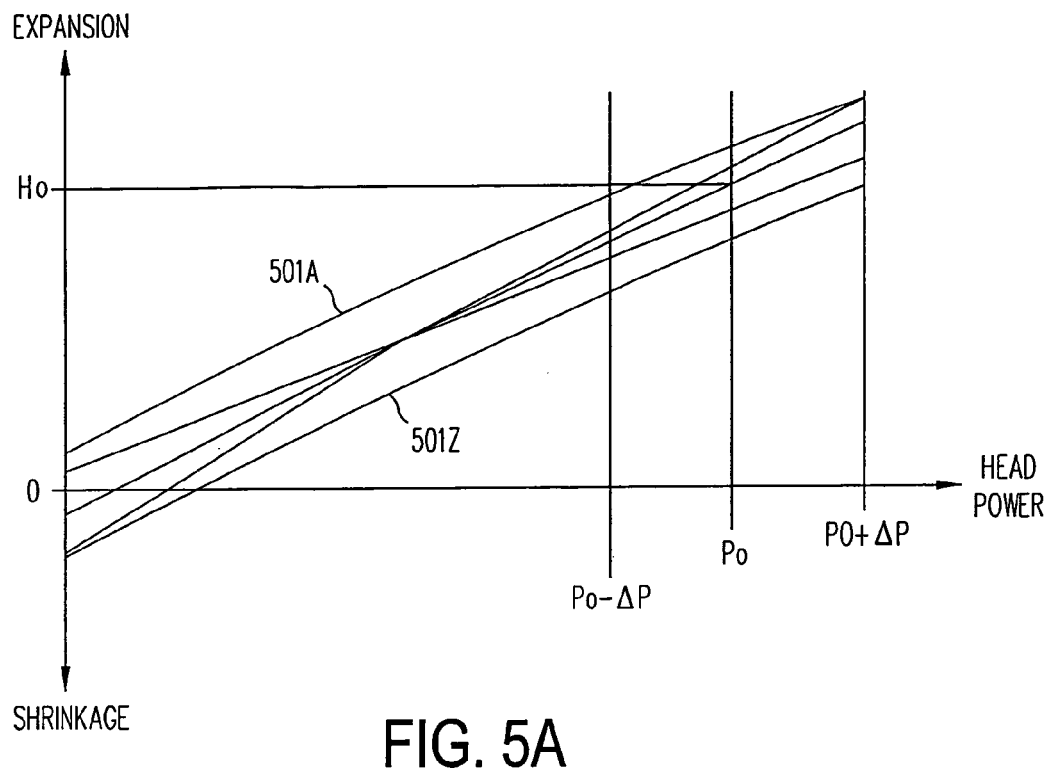
FIGS. 5A and 5B illustrate, in graphs, the change in expansion of a head as a function of power applied to the head (wherein distance Ho along the y axis may be, for example, on the order of 50 angstroms).

When designing a new head (of a next generation), it is decided that fly height is to be reduced by an amount Ho. In such a case, as can be seen in FIG. 5A, this head must be operated at a power level Po in order to provide the desired magnetic performance. In the next generation head, the head is to be polished (or otherwise machined) while powered up, and therefore, it is possible for the fly height to be reduced by an amount same as (or in the same order of magnitude as) the reduction in fly height due to expansion.

Note that the power on the x axis in FIG. 5A is for a predetermined optimal magnetic performance, which involves tradeoffs between one or more factors such as the following: (a) ability to thoroughly overwrite new data over old data, with minimum residual signal from the old data; (b) achieve a minimum soft error rate in handling data at the desired linear bit density while the head is centered on the track; (c) limit the maximum write current to minimize side writing by the head which, if excessive, will broaden the data track width and hence limit the track density capability of the head-disk combination; (d) limit the maximum write current to minimize effects such as pulse broadening or non linear transition shift, which if excessive could limit the linear bit density or soft error rate achievable with the head-disk combination; and (e) limit the maximum sense and write currents to avoid excessive head heating which could limit head lifetime due to electromigration failure. Each head manufacturer may use its own criterion for selecting a desired magnetic performance.

Both currents $I_{read}$ and $I_{write}$ (of the type described above) to be applied to a next generation of heads during lapping are predetermined in one embodiment, prior to lapping, by experimentation as follows. Initially, when designing a next generation head, a nominal value for process power Pp that is to be applied during lapping is determined based on experience with heads used so far (and which were fabricated (specifically, lapped) without being powered up). Specifically, the amount of expansion of each of several heads of a current generation is determined (e.g. using a metrology tool such as an atomic force microscope) as a function of power P applied during normal operation, and the response may be plotted in graphs 501A–501ZI (see FIG. 5A). For example, a current $I_{read}$ of 5 mA, and a current $I_{write}$ of 40 mA are applied to a current generation head (that operates at a fly height of 75 angstroms), and these current values form the power P shown in FIG. 5A (as per the above-discussed formula). The value of power P is varied by ΔP of various amounts to obtain the graphs 501A–501Z. As illustrated in FIG. 5A, when no power is applied the average head does not have a recession or a expansion, in the current generation of heads.

Note that in some embodiments, optimization of magnetic performance may also depend on other factors such as a specific recording channel: the electronics (read preamplifier and write driver) to produce and receive electrical signals, as well as a specific head-to-disk spacing (fly height). This optimization may be done in the context of achieving a predetermined disk data capacity which in turn is dependent on achieving a specific bit areal density (product of linear bit and track densities).

To determine the head power to be used during the manufacture of heads, one or more strips of heads (also called "test heads") are lapped while powered up, using the selected values of either or both currents $I_{read}$ and $I_{write}$ that generate power Po. During lapping of a number of test heads, one or more test heads are powered at the nominal power value Po, while others are powered at powers in a range ΔP around Po. After lapping, fabrication of test heads in the one or more strips is completed in the normal manner (e.g. passivation), and the strip(s) are diced, followed by mounting of each test head on a suspension.

Thereafter, magnetic performance of each test is characterized based on the factors (a)–(e) discussed above, during operation in a drive (which can be either a tape drive or a disk drive). Next, a metrology tool is used to measure the expansion of each test head when powered at Po. From the magnetic performance and the expansion measurement, the optimal power to be used during lapping is determined to be Pp: preferably the power Pp is selected to yield zero expansion when the test head is powered up at that power, and yet provide the desired magnetic performance. If necessary, the just-described power Pp is used as the power Po for another iteration of the above-described acts while lapping one or more additional strips of test heads, until the desired magnetic performance is achieved.

Figure 5B:
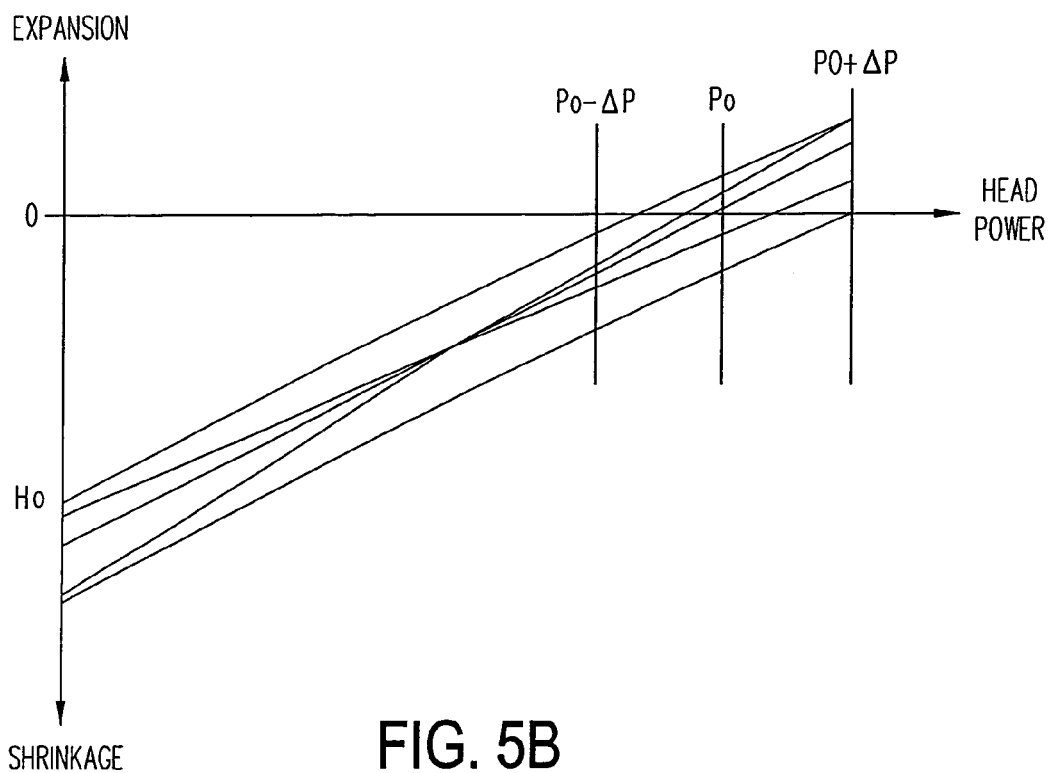

Thereafter, the power Pp is used as a predetermined value, during fabrication of the next generation heads (also called "second generation heads") in a production environment, to power all heads in a strip to the same power level Pp while lapping. All second generation heads fabricated in this manner may be used in a drive in the normal manner (subject to being tested in the normal manner). When such a second generation head is powered down, it has a concave surface in the pole tip region (as illustrated in FIG. 5B), and when powered up, the second generation head has a substantially flat surface in the pole tip region.

Energization of a second generation head during lapping as described herein ensures that even microscopic distortions of the head that are unique to head are planarized during the fabrication process, thereby to avoid deformation of the head from the planar shape during normal operation in a drive. Such a second generation head eliminates failures caused by head expansion of the type described above, thereby to facilitate smaller fly heights (and higher data storage densities) than in the prior art.

Moreover, applying normal operation power to a second generation head during fabrication eliminates any issues of electro-migration related failures that would be otherwise likely if a bias current is applied. Furthermore, applying power to the head itself to heat the pole tip region eliminates the need for an additional separate heating element of the type described in U.S. Pat. No. 5,991,113.

Note that the above-described process to fabricate second generation heads can be repeated, with the second generation heads as the starting point to create (i.e. to provide data for) another generation of heads (also called "third generation") that are even more planar during normal operation in a drive.

Numerous modifications and adaptations of the embodiments described herein will be apparent to the skilled artisan in view of the disclosure. For example, the powering down of an individual head 211I as described above can be performed during either kind of lapping operation: lapping of an entire strip, or lapping of each head individually, depending on the embodiment.

Also, a strip of heads that is lapped while energized as described herein can be either a row or a column of a wafer, depending on the embodiment.

Furthermore, although the above description refers to lapping, any other process (such as chemical mechanical polishing) may be used to remove a bulge (caused by heating) from an energized head.

In some embodiments, although heads 211A–211M of a strip 210 are powered up, they are not used for reading or writing data during lapping as described herein. Such embodiments have the advantage of using conventional lapping elements, thereby eliminating the need for a magnetic lapping body of the type required by U.S. Pat. No. 5,632,669.

However, in several embodiments, the energized heads are used for reading and/or writing during lapping, in the manner described in U.S. Pat. No. 5,632,669. These embodiments distinguish over U.S. Pat. No. 5,632,669 for at least the following reason: an entire strip of heads is powered up and lapped (i.e. without dicing until after lapping is completed).

In several embodiments, a strip of heads is diced, and after physical separation of all heads from one another, each head is individually lapped while powered up. Individual lapping of each head while energized can be done simultaneously with individual lapping of one or more other heads, e.g. in a manner similar to U.S. Pat. No. 5,632,669. A distinction of such embodiments over U.S. Pat. No. 5,632,669 has been mentioned above: a lapping body need not contain magnetic material. In such embodiments, as soon as a head's individualized lapping is to be stopped, that particular head is removed from a lapping element (in a manner similar to U.S. Pat. No. 5,632,669), while remaining heads continue to be lapped.

In certain embodiments, a lapping element does contain magnetic material in a manner similar to U.S. Pat. No. 5,632,669. At least one distinction of such embodiments over U.S. Pat. No. 5,632,669 is that a signal read by the head from the magnetic material is not monitored to determine when to stop lapping. Instead, any method well known in the art for stopping the lapping of non-energized heads can be used to determine when to stop lapping of an energized head (e.g. by measuring a change in resistance during lapping). For this reason, when some embodiments of heads are powered up (e.g. in a storage device), they have surfaces other than flat but within a predetermined range around a flat surface.

Furthermore, although in certain embodiments, lapping is stopped based on signals from electrical lapping guides, in other embodiments, other signals (such as a signal from a MR element) are taken into account in determining when lapping is to be stopped.

Moreover, although several of the embodiments described above use a head 211I as a flying head in a disk drive, heads for contact recording can also be lapped in the manner described herein, i.e. while being energized in the manner similar or identical to energization during normal operation in a drive.

Although in some embodiments, a number of test heads are fabricated simultaneously, in other embodiments, test heads are fabricated successively, one after another, with current levels required by a preceding test head to write data being used during energized lapping of a next test head, until a difference in current levels and/or a difference in planarization between two successive test heads falls below a predetermined threshold (which may be, for example, same as a manufacturing tolerance).

Moreover, as would be apparent to the skilled artisan in view of the disclosure, heads of the type described herein can be used for any type of recording, such as longitudinal recording or perpendicular recording.

Furthermore, although in certain embodiments the same power is applied to all heads in a strip during lapping, in other embodiments different power is applied to each head, depending on the characteristics of each head that may have been measured prior to lapping. For example, in such embodiments, there is apriori information on various properties of the read transducer and/or the write transducer of each head being manufactured in a wafer, such as read sensor length and photoresist thickness. This information is maintained even after the wafer has been cut into multiple strips of heads, and used while each strip is being lapped, to apply different currents to different heads and/or to terminate the application of power to different heads at different times.

Figure 6A:
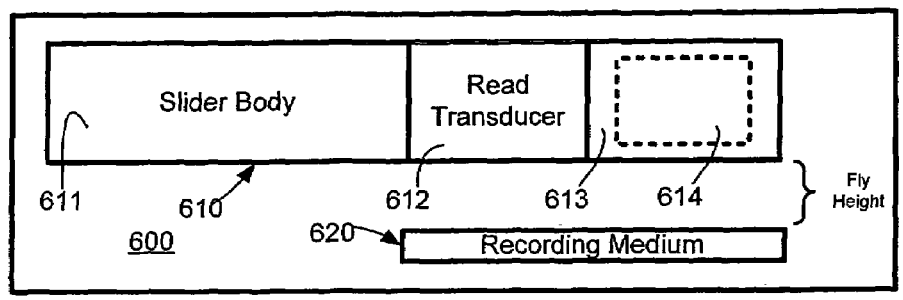
FIG. 6A illustrates, in a block diagram, a drive in accordance with the invention having a head 610 that contains a heating element 614 that generates heat when a write operation is not performed by a write transducer 613.

A drive 600 in accordance with the invention includes a head 610 (FIG. 6A) having a heating element that is capable of generating heat sufficient to cause head 600 to have a shape during non-operation that is similar or identical to the shape that head 610 has when performing an operation on a recording medium 620 in the drive 600. FIG. 6A illustrates an embodiment in which the just-described operation is a write operation, and as will be apparent to the skilled artisan from the enclosed disclosure the same principle is applicable to a read operation.

Specifically, as discussed above, when performing a write operation, head 600 expands due to dissipation of heat generated by passage of current $I_{write}$ through a write transducer 613. In the embodiment illustrated in FIG. 6A, head 610 includes a heating element 614 that is located adjacent to or overlapping write transducer 613.

Note that unless described otherwise, head 610 can have any features normally found in a conventional head, e.g. head 610 has a read transducer 612 adjacent to the above-described write transducer 613 and furthermore head 610 may be formed integrally on a slider, so that read transducer 612 is sandwiched between the slider body 611 and write transducer 613. Furthermore, depending on the embodiment, other configurations for a head may be used in the manner described herein, e.g. a head in which a write transducer is sandwiched between the slider body and the read transducer.

Heating element 614 is activated in accordance with the invention when the write operation is not being performed by write transducer 613. Hence, even when not performing a write operation, head 610 generates sufficient heat (and in some embodiments exactly the same amount of heat) to cause head 610 to be at a temperature similar (or in some embodiments identical) to the head's temperature during the write operation.

Figure 6B:
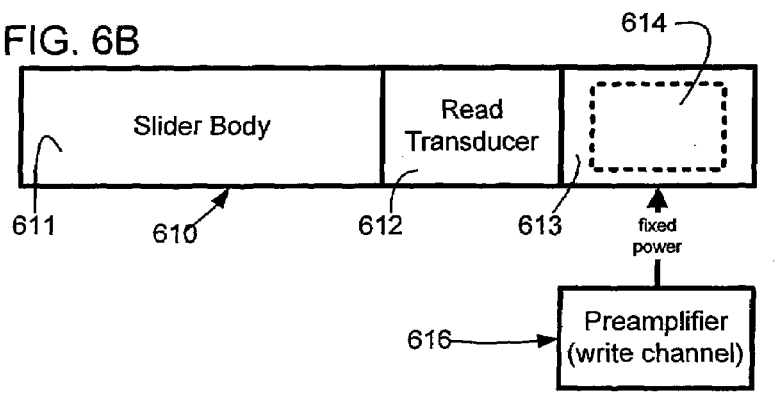
FIG. 6B illustrates, in a block diagram, use of a preamplifier 616 to supply a fixed amount of power to head 610, regardless of whether or not a write operation is being performed.
Figure 6C:
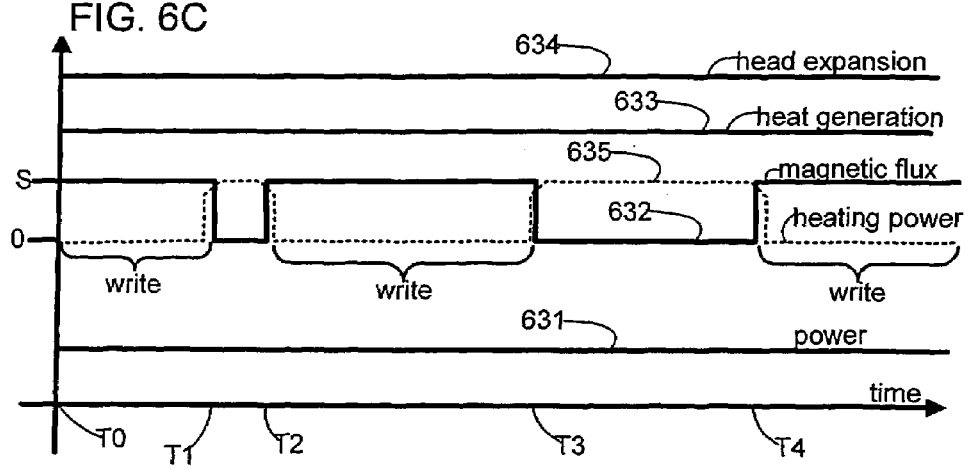
FIG. 6C illustrates, in a graph, use of a fixed amount of power by head 610 although varying the magnetic flux as a function of time, to perform write operations.

In one embodiment illustrated in FIG. 6B, a write channel portion of a preamplifier 616 is coupled to head 610 to provide a fixed amount of power thereto, regardless of whether or not a write operation is being performed. As shown in FIG. 6C, by graph 631, the power supplied to head 610 remains constant as a function of time, even though head 610 generates a changing magnetic flux (as shown by graph 632).

In the example illustrated in FIG. 6C, between times T0 and T1, a write operation is performed and during this time write transducer 613 generates a magnetic flux that saturates the yoke, and therefore causes a signal to be recorded in recording medium 620 (FIG. 6A). Thereafter, between times T1 and T2, no write operation is performed, and therefore write transducer 613 does not generate magnetic flux, although the same power is still being supplied (as per graph 631) to head 610.

During this period T1–T2, the fringing field of head 610 (FIG. 6A) is at a minimum and therefore there is no recording. Instead, the supplied power is dissipated by heating element 614, simply to generate heat, as illustrated by graph 635 (which is shown dashed). For this reason, across the entire interval T0–T2, head 610 generates heat at the same rate, as illustrated by graph 633 (FIG. 6C), i.e. regardless of whether or not a write operation is being performed. Therefore, during normal usage in a drive, head 610 can be maintained at a fixed temperature (or almost at the fixed temperature) relative to ambient, regardless of whether or not a write operation is being performed.

When head 610 remains at a fixed temperature, the expansion of head 610 (due to heat dissipation therein) remains constant across the entire interval T0–T2, as illustrated by graph 634. Therefore, during period T1–T2, head 610 has the same shape (and therefore the same fly height) regardless of whether or not a write operation is performed. In this manner, during normal usage in a drive over any period of time T0–T4, head 610 maintains a fixed shape or has a shape that varies within a predetermined range around the fixed shape. By maintaining its shape unchanged (or almost unchanged), head 610 maintains fly height (which is the distance between head 610 and recording medium 620), independent of performance of a write operation.

Depending on the embodiment, the location and rating of heating element 614 may be chosen to ensure that the distribution of heat within head 610 when using heating element 614 is similar (or in some embodiments identical) to heat distribution when using write transducer 613. To obtain the exact same heat distribution, several embodiments of the invention implement heating element 614 using the very same circuitry that is used in write transducer 613. Use of exactly the same circuitry has several advantages: (a) no new process step is required in fabrication of the head, (b) no additional circuitry has to be introduced into the head which in turn considerably simplifies the head design, and (c) the exact same heat distribution is obtained regardless of whether or not a write operation is being performed.

Figure 7:
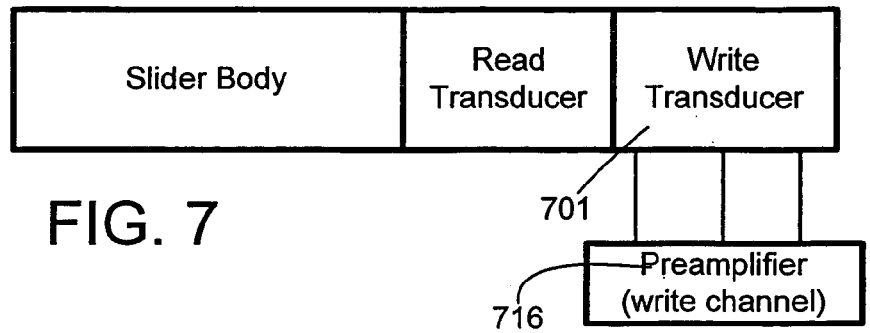
FIG. 7 illustrates, in a block diagram, one embodiment of a write transducer (in the head of FIG. 6A) having three terminals coupled to a preamplifier.

For these reasons, some embodiments of a head use a transducer 701 (FIG. 7) having a total of three terminals all of which are coupled to a preamplifier 716. The three terminals allow transducer 701 to be used as a write transducer 613 at certain times and as a heating element 614 at other times. Specifically, depending on the signals applied to the three terminals, transducer 701 operates in one of two modes: a write mode during which data signals are recorded, and a heating only mode during which no data are recorded. Regardless of which signals are being applied to the three terminals, at any given ambient temperature preamplifier 716 supplies the same amount of power to transducer 701, thereby to maintain the shape of the head and therefore its fly height as noted above.

Figure 8A:
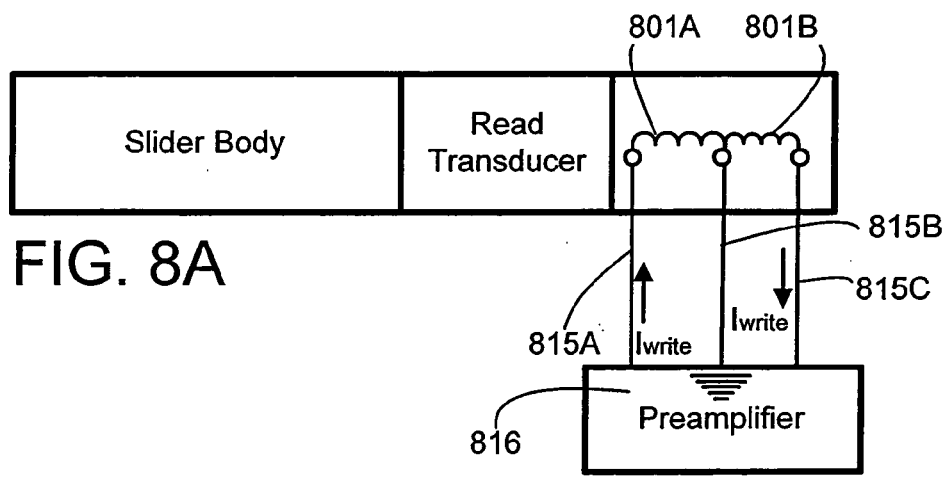
FIGS. 8A and 8B illustrate, in a block diagram, one embodiment of the head of FIG. 7 having a center tapped write transducer that is powered by a preamplifier in two different ways at two different instants in time, namely during a write operation and during heat generation when there is no write operation.

Although transducer 701 may be implemented in any manner well known to the skilled artisan in view of the disclosure, in certain embodiments a bi-modal transducer 701 is implemented by inserting a tap (e.g. a connection) at the center of an inductive coil as illustrated in FIG. 8A. Specifically, an inductive coil 801 (FIG. 8B) is divided by a center tap into two halves 801A and 801B (FIG. 8A). Inductive coil 801 has three terminals: two terminals at the two ends, and a third terminal in the center. The three terminals are coupled by wires 815A, 815B and 815C to a preamplifier 816. Note that instead of inductive coil 801, any other inductor having a center tap may also be used in the manner described herein for inductive coil 801.

In this embodiment, preamplifier 816 supplies the same amount of power to inductive coil 801 regardless of whether or not a write operation is being performed. However, preamplifier 816 changes the manner in which the power is applied to inductive coil 801, depending on whether inductive coil 801 is to be operated in a write mode or in a heating only mode. Specifically, when performing a write operation with inductive coil 801, preamplifier 816 supplies currents to/from the two halves 801A and 801B so that the currents are in phase with one another (e.g. the phase difference is zero as shown during the time period T0–T1 illustrated in FIG. 8C and the fringing magnetic field is a maximum). Therefore, the current $I_{write}$ flows in the same direction (e.g. from an end terminal via the center terminal to the other end terminal).

Note that the current supplied by preamplifier 816 (FIG. 8A) is an alternating current (AC), and therefore the direction of current $I_{write}$ (although illustrated in FIG. 8A as being clockwise) changes over time (e.g. the arrows in FIG. 8A are reversed so that the current flow can be shown going counter-clockwise). However, regardless of such change, during a write operation, current $I_{write}$ flows only through wires 815A and 815C, and there is no current flow through the center tap wire 815B.

Therefore, during the write operation, inductive coil 801 is used in a manner similar or identical to a conventional inductive coil having only two terminals (i.e. the presence of a center tap may be ignored during the write operation). Specifically, magnetic fields generated by the two halves 801A and 801B add to each other to generate a signal having a strength sufficient for switching the state of the recording medium. Hence, during a write operation, data are recorded in the recording medium in the normal manner.

In contrast, when there is no write operation being performed, preamplifier 816 still supplies currents to/from the two halves 801A and 801B but now the currents are out of phase (e.g. the phase difference is 180° as shown during the time period T1–T2 illustrated in FIG. 8C). Therefore, at a given instant illustrated in FIG. 8B, current $I_{write}$ enters inductive coil 801 (FIG. 8B) from each of its two ends, and after traversing the length of each half 801A and 801B, twice the amount of current leaves inductive coil 801 through the center tap. For this reason, two arrows (unlabeled) are shown adjacent to wire 815B in FIG. 8B.

Figure 8B:
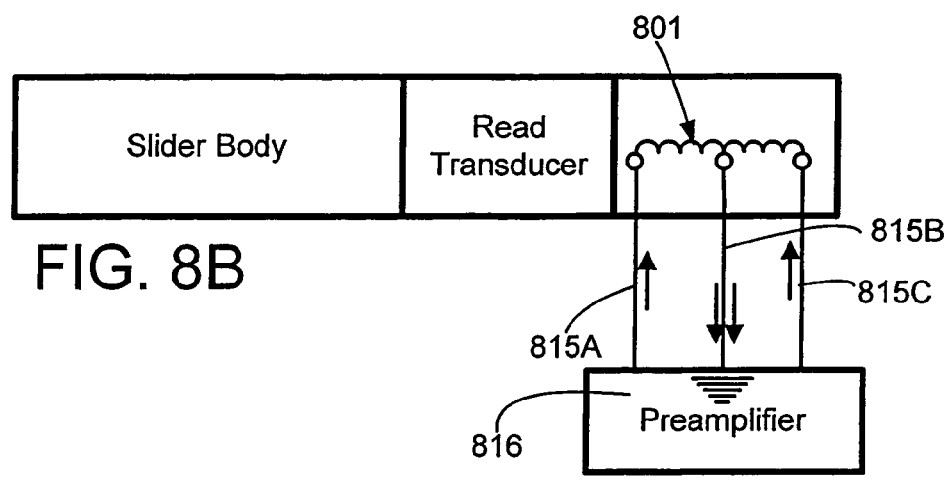

As noted above, current $I_{write}$ is an alternating current (AC) and hence the direction of all the arrows in FIG. 8B may be reversed to show a different moment in time (at which time the ground becomes the source of current $2*I_{write}$ which is split at the center tap and sinks into the preamplifier 816 via the respective wires 815A and 815B).

Since the currents in the two halves 801A and 801B are out of phase at the instant illustrated in FIG. 8B, the magnetic flux generated by their respective common mode fields cancel each other, and therefore there is no magnetic flux in the yoke. Depending on the physical locations of the two halves 801A and 801B relative to one another and relative to the yoke, their common mode fields may not completely cancel each other in the yoke, so as to generate a minimal amount of magnetic flux in the yoke. But the magnetic flux generated in the absence of a write operation is designed to be insufficient to cause a signal to be recorded by the recording medium.

Note that since the two halves 801A and 801B have the same resistance and also the same current at the two instants illustrated in FIGS. 8A and 8B, the same amount of heat is generated regardless of the direction of the current flow. Therefore, the same amount of heat is generated by use of a center-tapped inductor in accordance with the invention (e.g. by application of currents in the manner described herein), regardless of whether or not a write operation is being performed.

Figure 9A:
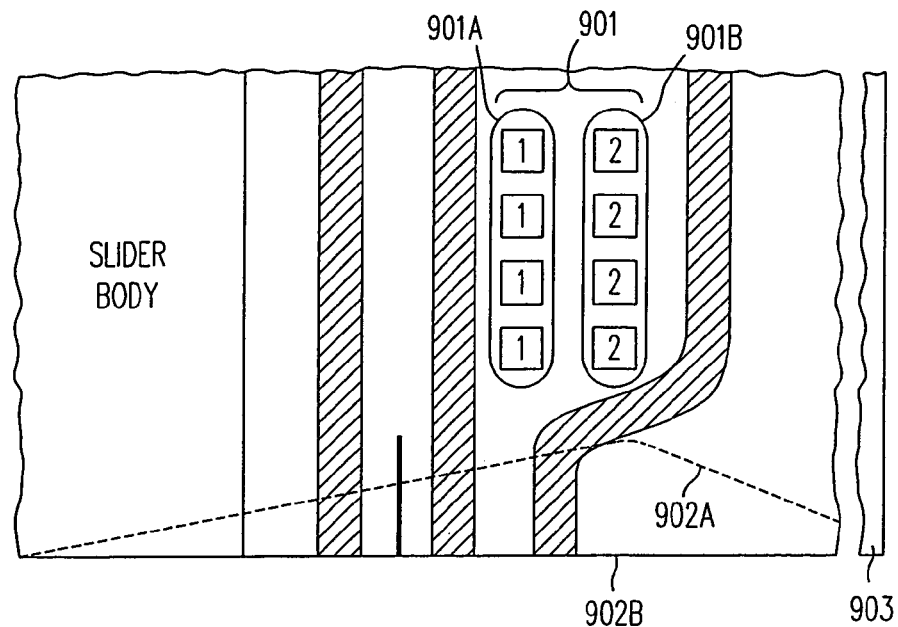
FIGS. 9A and 9B illustrate, in cross-sectional views, two alternative implementations of the head of FIGS. 8A and 8B.
Figure 9B:
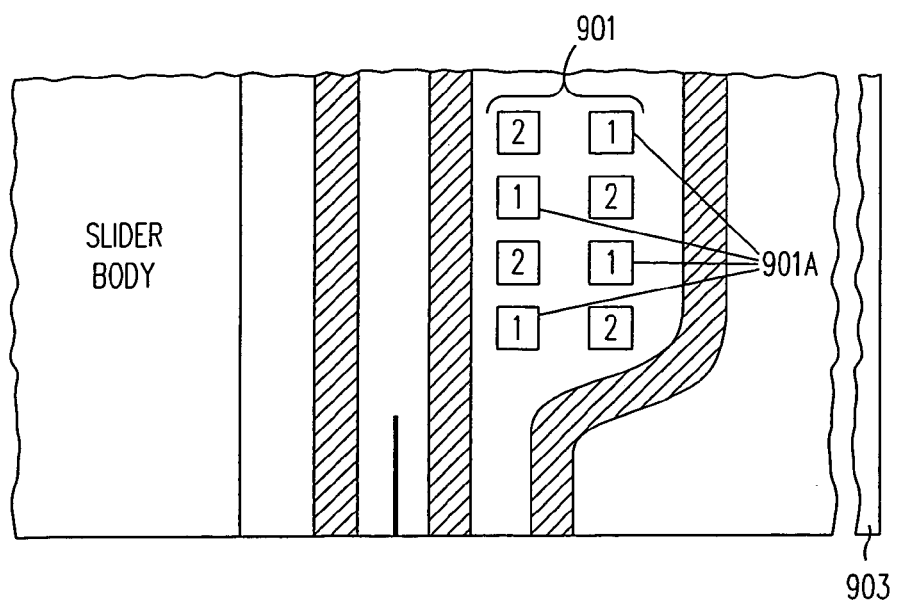

A center-tapped inductor of the type described above can be fabricated in any manner well known in the art. In some embodiments, the two halves 901A and 901B of a center-tapped coil are located in two distinct spaces (which may be in two separate layers) as illustrated in FIG. 9A. In FIGS. 9A and 9B, cross-sections of a portion of the coil that forms one half 901A are labeled with the number "1" whereas the cross-sections of the remaining portion of the coil that forms other half 901B are labeled with the number "2".

In such embodiments, the two spaces occupied by the two halves are vertically oriented and physically separate from each other, with one space being closer to the read element than the other space. In certain embodiments wherein a write transducer is formed by a coil located in two layers, a center tap is obtained by adding a trace to a via that interconnects one half of the coil formed in one layer to another half of the coil formed in the other layer.

Such embodiments may have the following drawback: a magnetic field generated by common mode current in the left space occupied by half 901A does not coincide with the magnetic field generated by common mode current in the right space occupied by half 901B (note that the words "left" and "right" are used relative to the reader's view of FIG. 9A and have nothing to do with the orientation of the head). Such embodiments are nonetheless used even when the magnetic field is not completely annulled, if the resulting magnetic field is smaller than the strength required for recording. For example, if the threshold disk coercivity is 4000 Oe and if the switching field is 6000 Oe, then annulment of the magnetic field resulting in a field as high as 2000 Oe may still be tolerated and used in some embodiments without adversely affecting the disk.

In other embodiments, the two halves 901A and 901B of a center-tapped inductive coil are intertwined around each other as illustrated in FIG. 9B. The intertwining may be achieved, for example, by use of vias between two separate layers in which the conductive elements of a coil are otherwise formed. In such embodiments, each of the two halves 901A and 901B share the same physical space, and therefore their magnetic fields have a greater overlap with each other than the configuration illustrated in FIG. 9A. For this reason, a write transducer with a center-tapped inductive coil having the configuration illustrated in FIG. 9B performs better at minimizing the magnetic field when a write operation is not being performed.

In certain embodiments, the entire coil of a write transducer is formed in a single layer, e.g. by two coils that are concentric with one another and that are each connected to the other at an inner end thereof, i.e. at the center and an additional trace is connected to the center to provide a center tap. Numerous such center-tapped write transducers will be apparent to the skilled artisan in view of the disclosure.

In the embodiments illustrated in FIGS. 9A and 9B, the head has a flat (or nearly flat) surface 902B when powered up because the head is fabricated to have a concave surface 902A when powered down. Specifically, the tip of each pole of the write transducer defines a concave surface 902A. Note that surface 902A is concave on a global scale that spans across the read transducer, the write transducer and may even extend up to the passivation layer for example. Therefore in certain embodiments surface 902A may have one or more non-uniformities on a local scale (e.g. on the order of the write gap). As noted above in reference to act 254 in FIG. 2B, such a concave surface is formed in several embodiments of the invention by removal of material from a head while powered up, wherein the powered up head has a convex surface prior to machining e.g. by lapping. The convex surface of such an un-machined powered up head is a mirror image of the concave surface obtained on cooling the head after machining, as illustrated in FIG. 4B.

In one embodiment, a preamplifier is coupled between a controller and a head of the type described herein. Such a preamplifier includes one or more current sources and also includes circuitry (called "mode selector") to operate the current source(s) in an appropriate one of the above-described two modes: write mode and heating only mode. For example, at certain times the mode selector operates the current source(s) in one mode to perform a write operation, and at other times (when not performing a write operation) operates the current source(s) in another mode to ensure that the heat dissipated in the head remains the same as during the write operation.

Figure 10A:
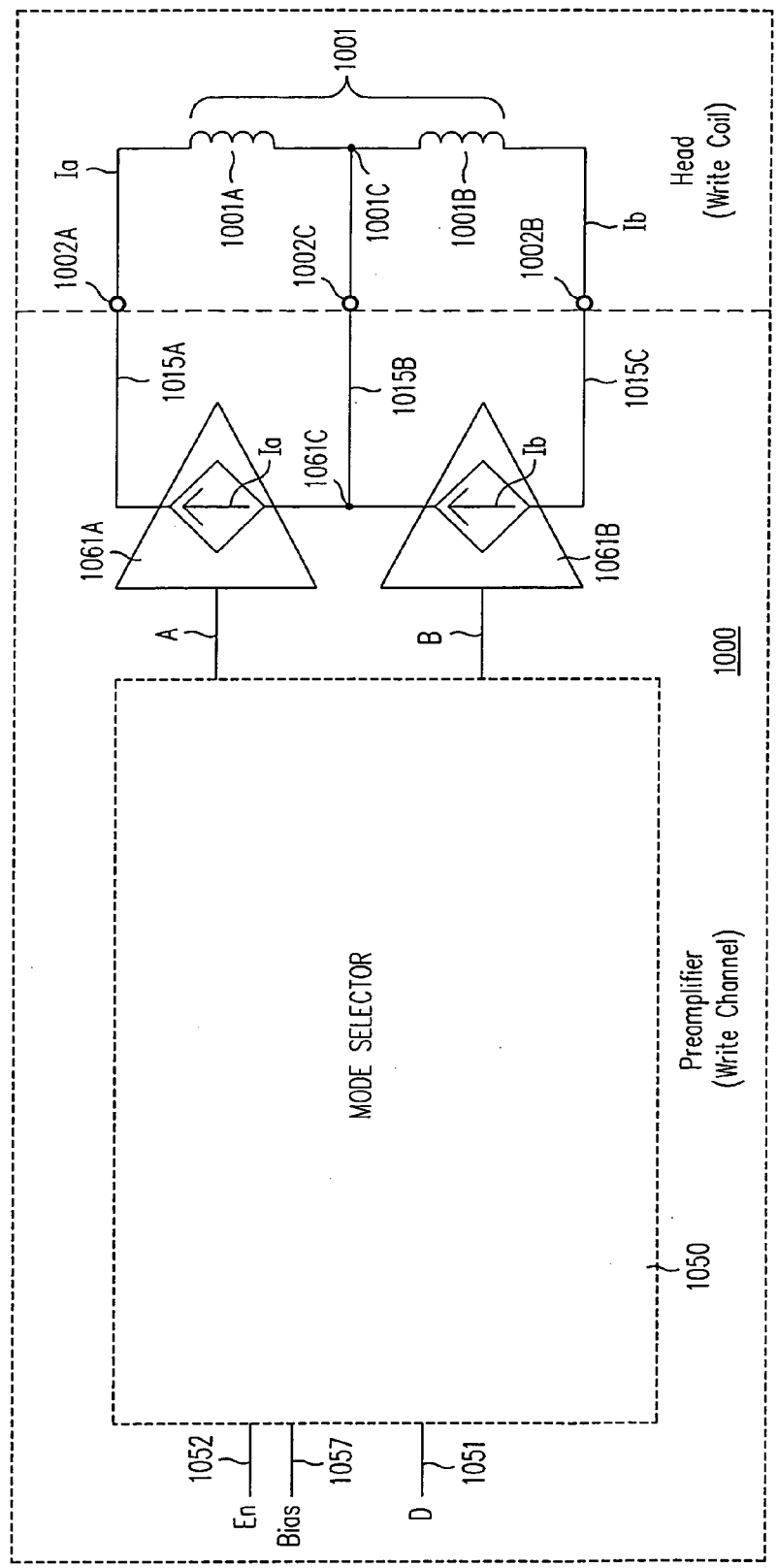
FIG. 10A illustrates, in a circuit diagram, a schematic of one embodiment of the preamplifier of FIG. 8A and 8B.

The configuration of a specific embodiment of such a preamplifier (also called "bimodal preamplifier") and its operation are now described, in reference to preamplifier 1000 illustrated in FIG. 10A. Specifically, preamplifier 1000 has two current sources 1061A and 1061B that respectively supply power to the two halves 1001A and 1001B of a center tapped inductive coil 1001. In certain embodiments, current sources 1061A and 1061B are continuously operated by a mode selector 1050 that is also included in preamplifier 1000. Current sources 1061A and 1061B are similar or identical to current sources of the prior art except that an enable signal to current sources 1061A and 1061B is always active (and for this reason an enable line is not shown in FIG. 10A).

Mode selector 1050 of an exemplary embodiment has a data line 1051 that receives a data signal D carrying digital data represented by two voltage levels (e.g. +5 volts and −5 volts) that encode either a logic value 0 or a logic value 1. Mode selector 1050 also has an enable line 1052 that receives a binary signal En which when inactive indicates that the head is to be heated (i.e. indicates that the write operation is being not performed).

Mode selector 1050 of this embodiment also has a bias line 1057 that receives a binary signal "Bias" to be used instead of data signal D when a write operation is not being performed. Note that when a write operation is not being performed, there will be no data and hence data signal D will be inactive. In such a case, signal "Bias" is used as a substitute for the data signal D. In some embodiments, signal "Bias" has the same duty cycle as data signal D (e.g. nearly 50% in cases where data signal "D" is encoded as a run length limited signal).

However, the duty cycle of the signal "Bias" as well as the frequency thereof (e.g. any portion of the frequency spectrum) may be selected depending on the amount of heat that needs to be generated for the head to achieve a predetermined shape. The heat that is generated also depends on the amplitude of currents Ia and Ib that are applied to the respective halves 1001A and 1001B, and the amplitude can also be chosen to ensure that the head achieves the predetermined shape, as described herein.

Therefore, halves 1001A and 1001B of a write coil continue to be heated at the same rate regardless of which of these two signals are applied to the current sources (i.e. same heat is generated by the head when either signal "Bias" is applied or when data signal "D" is applied). In one example, a signal "Bias" that is used during a heating only mode is derived from a data signal "D" that was used in a previous writing mode. For example, the waveform for such a signal "Bias" may be generated by time shifting the signal D, and the waveform may be repeated as often as necessary while the enable signal "En" remains inactive.

Each of the three signals, namely signals "En", "D" and "Bias" that are received by preamplifier 1000 are provided by other circuitry (not shown) of the type typically referred to as a "controller". Such a controller also generates a signal Wx (not shown in FIG. 10A) that is supplied to each of the current sources 1061A and 1061B in preamplifier 1000. Signal Wx is a scaling factor, which sets the maximum positive and negative values for the write current Iw to be generated by sources 1061A and 1061B based on data signal D. Specifically, the current Iw generated by each current source is given by the following formula: $Iw = Wx En(2D-1)$.

Depending on the embodiment, a controller of the type well known in the art may be modified by a skilled artisan in view of this disclosure, to generate signals of the type described herein. Generation of such signals may be based on a number of different factors, e.g. the duty cycle of the bias signal may be changed depending on a signal indicative of the temperature in a drive (e.g. disk drive or tape drive), and/or a signal that indicates the temperature of the head. Moreover, if a head is to be heated, the controller may also increase scaling factor Wx beyond saturation, but below a maximum value Wmax that is known to cause a failure. Such a controller may be designed (in accordance with this invention) to maintain the geometry of a recording head constant with respect to the head/media interface regardless of the ambient temperature and regardless of the operating mode of the head.

As would be apparent to the skilled artisan, the ambient temperature and operating mode of a head are coupled to the head geometry (and/or slider geometry) by the coefficients of thermal expansion for the various materials that comprise the head. Therefore, if a head is constructed to have an optimal geometry at a given operating temperature, that geometry can be maintained by a controller of the type described above, e.g. by keeping a departure from this temperature within a predetermined range (e.g. within 10%).

Such a head may be designed to have one of a number of shapes that approximate a predetermined shape (such as flat) when the head is at a temperature within the predetermined range. In some embodiments, the head may contain materials whose coefficients of thermal expansion are balanced in a predetermined manner, so that the head maintains its predetermined shape regardless of its temperature within the predetermined range.

Although the above description refers to use of feedback in the form of a signal indicative of the temperature in a drive and/or the temperature of the head, such feedback is not used in other embodiments. For example, in such other embodiments, the controller may generate a predetermined bias signal with a fixed duty cycle, e.g. 50%, regardless of the temperature of the head.

Such a controller may be implemented as, for example, an appropriately programmed microcontroller or digital signal processor, although an application specific integrated circuit (ASIC) may also be used as will be apparent to the skilled artisan in view of the disclosure. Furthermore, current sources 1061A and 1061B can each be implemented as a linear source constructed with transistors or a switching source constructed with transistors in an H-bridge configuration.

Referring to FIG. 10A, in one embodiment of a preamplifier 1000, two current sources 1061A and 1061B included therein are connected to each other in series (e.g. the positive terminal of source 1061B is connected to the negative terminal of source 1061A). Furthermore, the positive terminal of current source 1061A is coupled by a wire 1015A to a terminal 1002A of the head which is internally coupled (in the head) to an end of the write transducer 1001. Another terminal 1002C of the head is internally coupled to the center tap of the write transducer 1001. Terminal 1002C is connected by wire 1015B to a junction 1061C between the sources 1061A and 1061B (i.e. where the positive terminal of source 1061B is connected to the negative terminal of source 1061A). Finally the other end of the write transducer is internally connected to a terminal 1002B on the head and this terminal 1002B in turn is connected by a wire 1015C to the negative terminal of current source 1061B.

Although in the above-described embodiment, which is illustrated in FIG. 10A, a wire 1015B physically connects a center tap 1001C of the write transducer to a junction 1061C between the current sources 1061A and 1061B, in an alternative embodiment the center tap 1001C and the junction 1061C are not physically connected to one another and instead are simply grounded (thereby to implement a logical connection there-between). Specifically, center tap 1061 is coupled to a source of the ground reference voltage in the preamplifier 1000, and in addition center tap 1010C is also connected to a source of the ground reference voltage.

Depending on the implementation of such an alternative embodiment, center tap 1001C may be connected via any ground terminal of the head, which ground terminal may be shared with one or more other devices in the head, such as a read transducer. If a read transducer of such a head already includes a ground terminal, then modifying the head to implement a center tap (for a write transducer) as described herein does not require any additional terminals because any ground reference terminal that is otherwise in the head can be also coupled to the center tap. In such an embodiment, the ground terminal may need to be designed to sink the current $2*I_{write}$ in addition to whatever current is being otherwise sinked.

When signal En is active (i.e. during a write operation), mode selector 1050 supplies to current sources 1061A and 1061B, as their respective control signals A and B, identical copies of signal D that is received by mode selector 1050. In response, current sources 1061A and 1061B operate in unison, to generate currents Ia and Ib respectively, which currents flow through wires 1015A and 1015C. Note that current sources 1061A and 1061B are sources of AC current, and therefore, currents Ia and Ib are in phase with each other. Specifically, both currents Ia and Ib rise simultaneously and fall simultaneously, thereby reinforcing each other. Ideally, there is no current flow on wire 1015B. Note that in reality, due to manufacturing tolerances, there may be a differential current (Ia−Ib) which is sufficiently small so as to be negligible.

When signal En is active (i.e. during heating only), mode selector 1050 supplies to current sources 1061A and 1061B, as their respective control signals A and B, two different versions of signal D that is being received by mode selector 1050. Specifically, one of signals A and B is inversely related to the other, e.g. if A is high B is low and vice versa. Typically, signal D is at logic value 0 for the duration in which signal En is active (which is illustrated in this embodiment as an active high signal). Therefore, there is normally no change in the values of signals A and B during the time that signal En is active. In response, current sources 1061A and 1061B generate currents Ia and Ib that are out of phase with one another.

Specifically, current Ia rises in the positive direction when current Ib is falling in the negative direction and vice versa. Therefore, wire 1015B carries the sum of the two currents, i.e. Ia+Ib. Again, ideally, there is no current flow on wire 1015B because the currents in opposite phase should cancel each other on reaching the center tap. In reality, due to manufacturing tolerances, there may be a current (Ia+Ib), but such a current is selected to be sufficiently small so as to be negligible.

A mode selector 1050 of the type described above can be implemented in any manner that is apparent to the skilled artisan in view of the disclosure. However, in certain embodiments, mode selector 1050 is implemented by use of active devices formed in an application specific integrated circuit (ASIC) by two gates, a switch and an inverter, as described next.

Figure 10B:
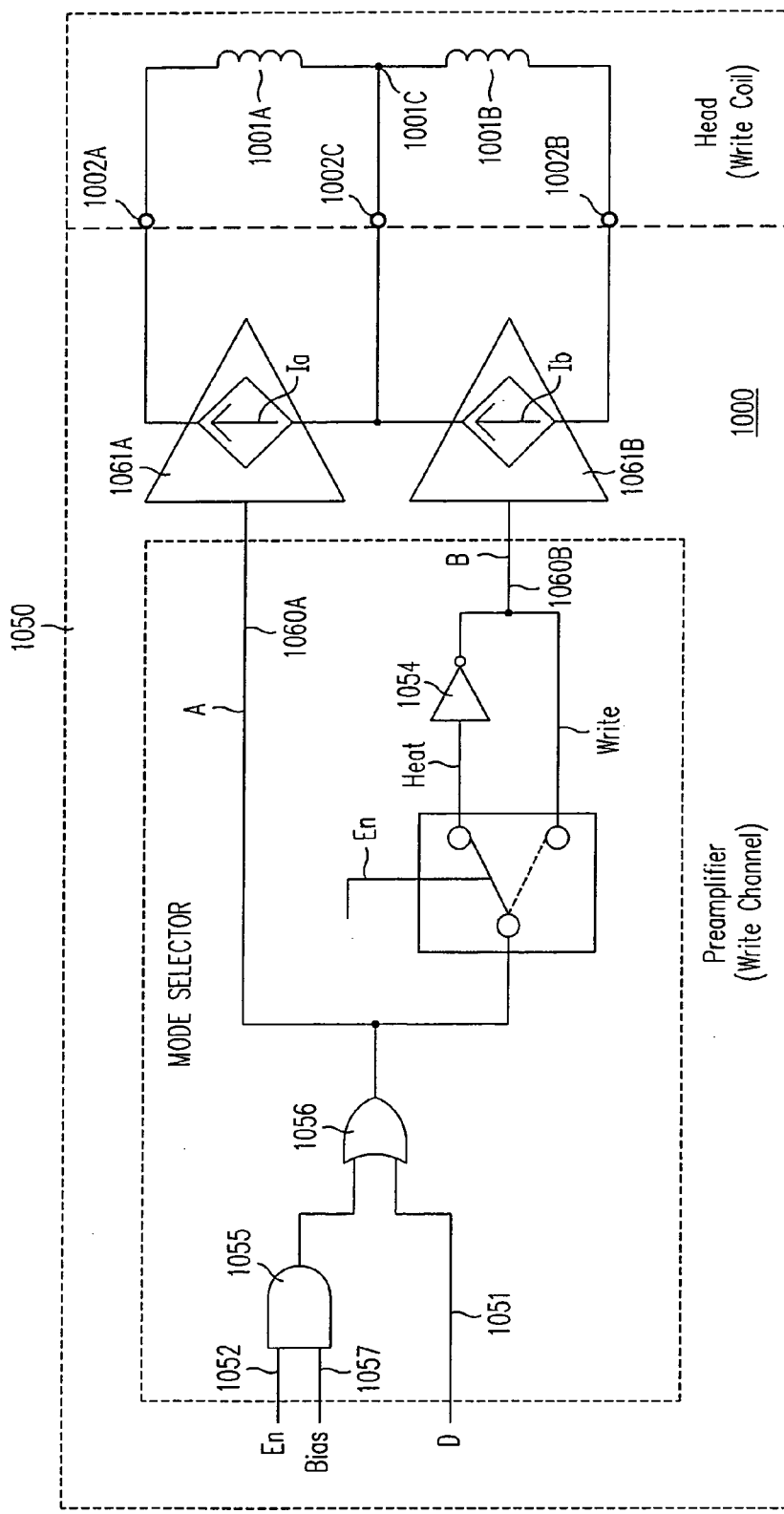
FIG. 10B illustrates, in a circuit diagram, a schematic of one embodiment of a mode selector used in the preamplifier of FIG. 10A.

Specifically, mode selector 1050 illustrated in FIG. 10B includes an AND gate 1055 that is coupled to an enable line 1052 that carries signal En (discussed above) and another line 1057 that carries a bias signal "Bias" (which is a substitute for the data signal "D"). The output of AND gate 1055 is coupled to an input of OR gate 1056. Another input of OR gate 1056 is coupled to a data line 1051 that carries signal D (discussed above).

The output of OR gate 1056 on line 1060A is a signal A which controls the operation of current source 1061A as described above. OR gate 1056 generates as its output any one of the two input signals namely, a signal D or a signal (En AND Bias). The signal (En AND Bias) is active only when signal D is inactive and vice versa. Hence, OR gate 1055 generates at its output, whichever of these two signals is active, at any given moment in time.

Signal A is also applied as an input to a switch 1053 having two outputs, namely a hold line and a write line. Switch 1053 is controlled by signal En (which is received on enable line 1052), to connect its input to the hold line when signal En is active. The signal on the hold line passes through an inverter 1054 and is supplied on line 1060B as signal B that in turn controls operation of current source 1061B as described above. Note that when signal En is inactive, switch 1053 supplies the signal A received at its input to the write line which in turn is connected to line 1060B. Therefore, when signal En is inactive, signal A is actually supplied as signal B on line 1060B.

Figure 10C:
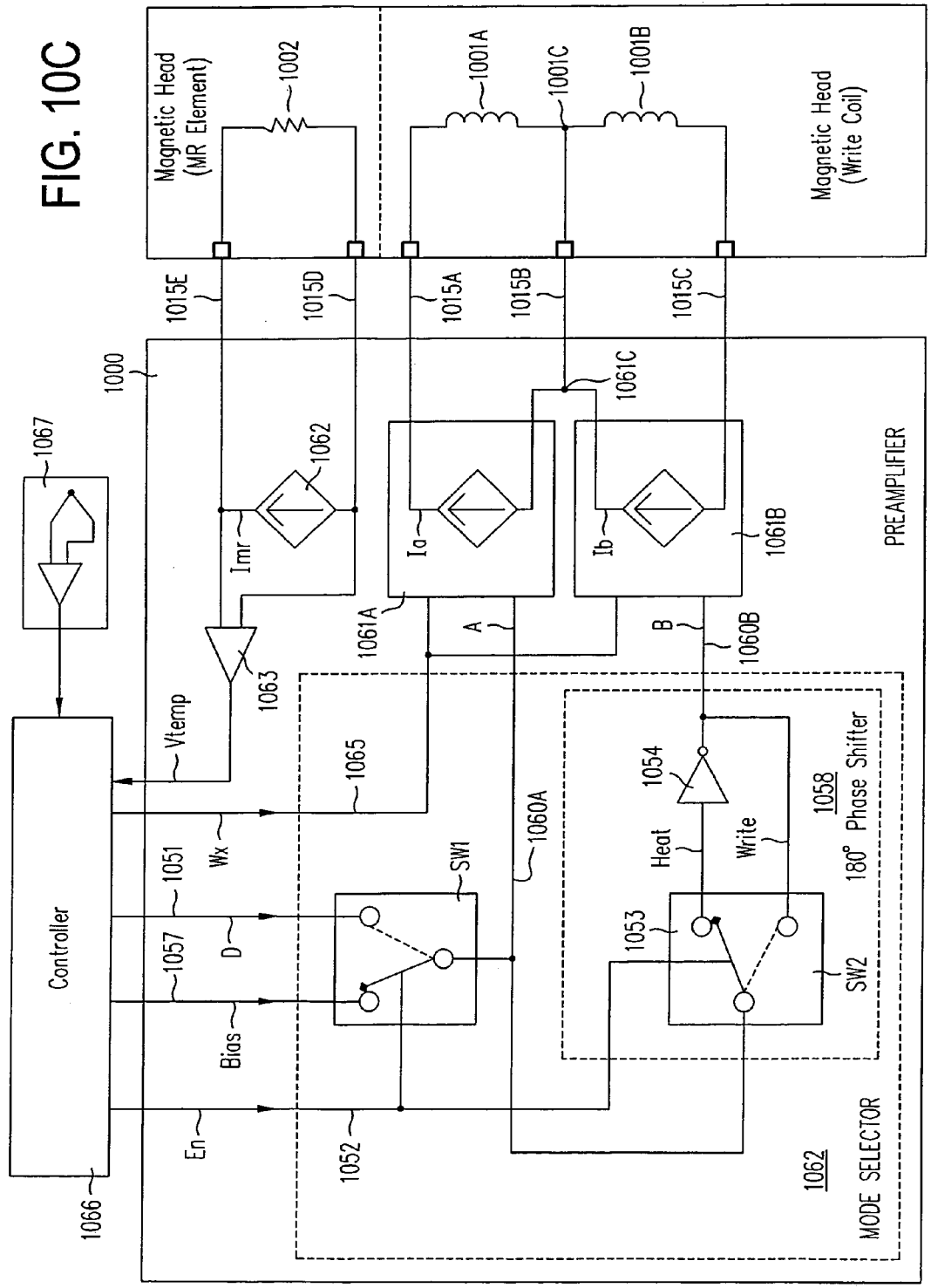
FIGS. 10C and 10D illustrate, in a circuit diagram, a schematic of two embodiments of the preamplifier of FIG. 10A.

Although the above description of mode selector 1050 refers to use of logic gates, namely AND gate 1055 and OR gate 1056, some embodiments of a mode selector may use other devices such as a switch SW1 illustrated in FIG. 10C. In FIG. 10C, switch SW1 receives signals "D" and "Bias" and selectively (as indicated by signal "En" on a control line 1052) passes one of these two signals to line 1060A. As noted above, signal 1060A carries the signal "A" which is to be used to control operation of current source 1061A.

In addition to switch SW1, mode selector 1062 includes a 180° phase shifter that in turn is formed by a switch 1053 (also called switch SW2) and an inverter 1054. Switch 1053 and inverter 1054 of FIG. 10C have configuration and operation identical to the configuration and operation of the corresponding components discussed above in reference to FIG. 10B. In the embodiment illustrated in FIG. 10C, scaling factor Wx is shown explicitly as being supplied via line 1065 to the two current sources 1061A and 1061B. Note that a controller 1066 generates signal Wx and also generates signals En, Bias, and D. Furthermore, in the embodiment illustrated in FIG. 10C, controller 1066 generates these signals depending on, for example, signal Vtemp which indicates temperature on a head and a signal from a thermocouple 1067 which indicates the temperature in a drive in which the head is mounted.

Signal Vtemp may be generated in any manner that would be apparent to the skilled artisan in view of the disclosure. However, in certain embodiments, signal Vtemp is generated from a signal that in turn is obtained from a read transducer in the head. Specifically, such a signal Vtemp is illustrated in FIG. 10C as being generated by an amplifier 1063 that in turn has its two ends coupled to the two ends of current source 1062. Current source 1062 in turn is coupled by wires 1015D and 1015E to the two terminals on a head that are internally coupled to the two ends of a read transducer 1002.

Figure 10D:
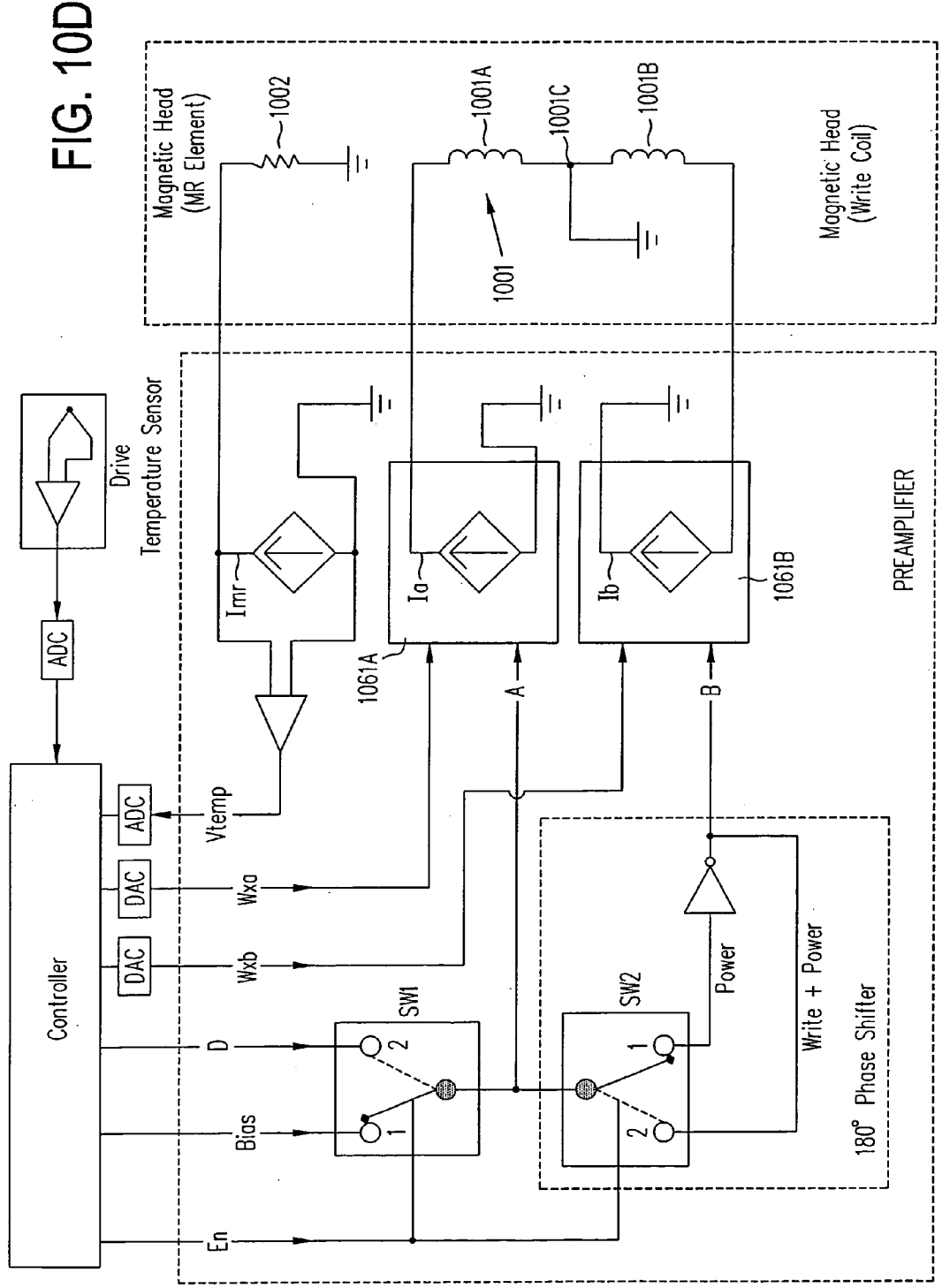
Figure 10E:
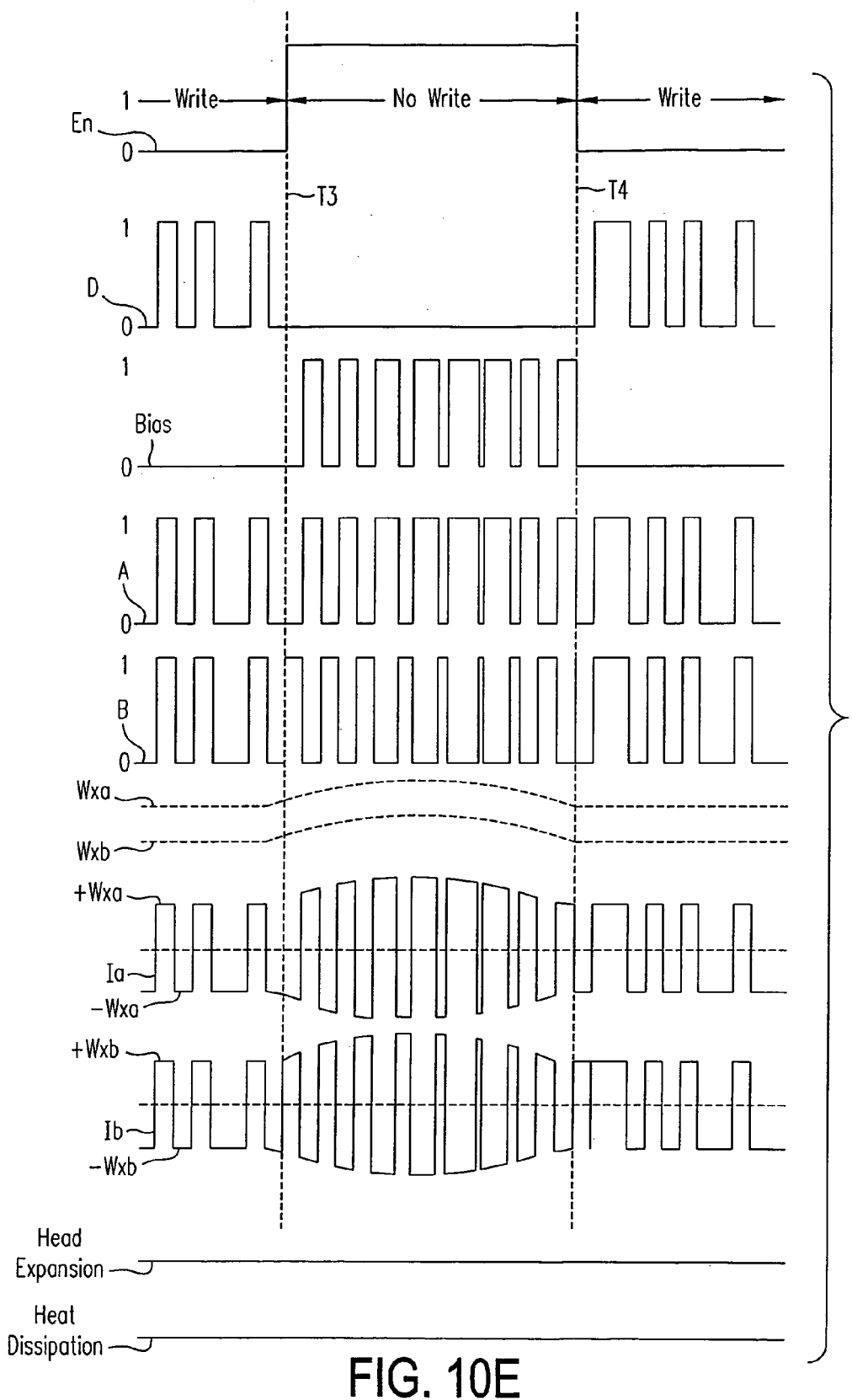
FIG. 10E illustrates, in a graph, various signals, as a function of time in one exemplary usage of a center-tapped write transducer in accordance with the invention.

Note that although FIG. 10C illustrates an embodiment in which a single line 1065 carries a single scaling factor Wx that is used in some embodiments with both current sources 1061A and 1061B, in other embodiments each current source may be provided with its own scaling factor as illustrated in FIG. 10D. Specifically, in FIG. 10D, a scaling factor Wxa is applied to current source 1061a and another scaling factor Wxb is applied to current source 1061b. Use of two different scaling factors Wxa and Wxb allows the respective currents Ia and Ib (see FIG. 10E) generated by the two current sources to be made a little different from each other, in case the center tap 1001C is not quite at dead center of the write coil 1001. As illustrated in FIG. 10E, the scaling factors Wxa and Wxb change an envelope which defines the amplitude of currents Ia and Ib. Moreover, as illustrated in FIG. 10E, currents Ia and Ib have the same phase when performing a write operation prior to time T3 and after time T4, but are out of phase when no write operation is being performed (between times T3 and T4).

Furthermore, FIG. 10D illustrates coupling of a source of the ground reference voltage to the center tap 1001C. In addition, read element 1002 is also shown as having one end coupled to ground. Therefore in such an embodiment, both the read element 1002 and the write element 1001 share a terminal which is coupled, external to the head, to a source of the ground reference voltage. Therefore, the embodiment illustrated in FIG. 10D benefits from applying in-phase and out-of-phase currents in the manner described herein and yet requires only four terminals. Specifically, three terminals of the head are shown connected to the preamplifier and the fourth terminal which is not shown in FIG. 10D is coupled to a source of the ground reference voltage.

Figure 10F:
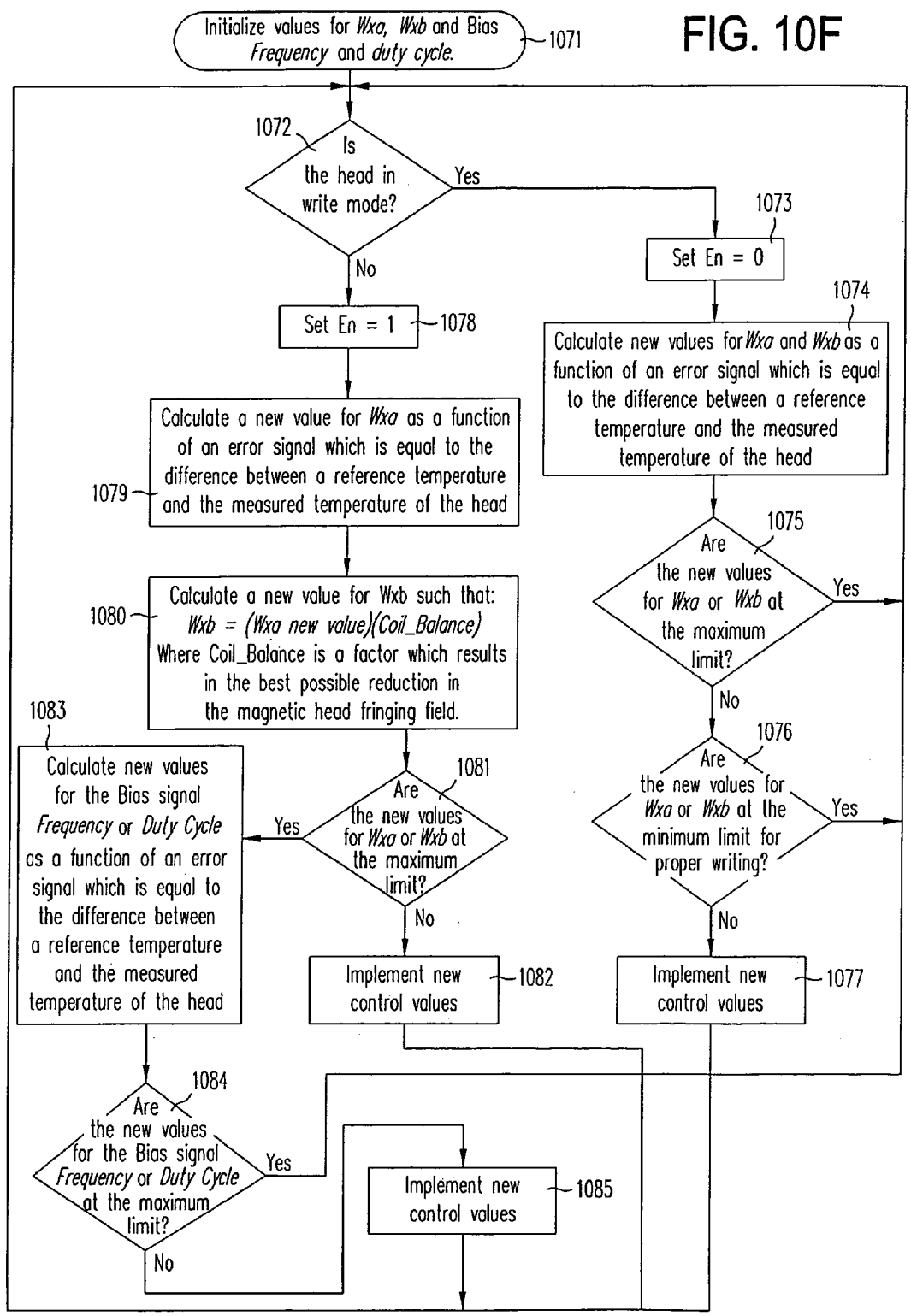
FIG. 10F illustrates, in a flow chart, acts that are performed by a controller in accordance with the invention.

FIG. 10F illustrates, in a flow chart, acts 1071–1085 that are performed by a controller in accordance with the invention. Specifically, in act 1071, the controller initializes values for the two scaling factors Wxa, Wxb and also initializes the frequency and duty cycle for the signal "Bias". The values of the frequency and duty cycle may be chosen, e.g. based on empirical results of testing various heads of the same or similar configuration. Next, in act 1072, the controller checks if the head is in a write mode, and if so, goes to act 1073 and sets the value of signal "En" to 0 thereby to set switches SW1 and SW2 for operation in writing mode. Next, the controller goes to act 1074 to calculate new values for Wxa and Wxb as a function of an error signal which is equal to the difference between a reference temperature and the measured temperature of the head. For example, if a proportional control is used then Wxa and Wxb may be computed as follows wherein P4 is a constant that is empirically determined.

$$Wxa = Wxb = P4*(\text{Ref. Temperature} - \text{Measured Temperature})$$

Note that reference temperature is the temperature at which the head has been designed to operate. Next, in act 1075, the controller checks if the new values for Wxa or Wxb are at the maximum limit and if so, simply returns to act 1072. If not, controller goes to act 1076 and checks if they are at the minimum limit and if so again returns to act 1072. If the new values are within limits, then in act 1077 the controller implements these new values, e.g. by driving signals to the preamplifier.

Note that by appropriately modifying the values of Wxa and Wxb, certain embodiments modulate an excess current that is applied to each half of the write transducer (over and beyond the current needed to generate the magnetic field necessary for recording). In such embodiments, the amount of the excess current is changed in an appropriate manner by the controller, depending on the current temperature of the head.

Referring to act 1072, if the answer is "no" then the controller goes to act 1078 and sets the value of signal "En" to 1 thereby to set switches SW1 and SW2 in heating only mode. Next, the controller goes to act 1079 to calculate a new value for Wxa as another function of the error signal which is equal to the difference between a reference temperature and the measured temperature of the head. Here as well, if a proportional control is used then Wxa may be computed as follows wherein P1 is a constant that is also empirically determined.

$$Wxa = P1*(\text{Ref. Temperature} - \text{Measured Temperature})$$

Next, the controller goes to act 1080 to calculate a new value for Wxb as a function of Wxa and a factor called "Coil_Balance" which results in the best possible reduction in the magnetic head fringing field. As noted above for P1 and P4, such a factor may also be determined empirically. Next, the controller goes to act 1081 and checks if the new values of Wxa and Wxb are at the maximum limit and if not then goes to act 1082 to implement the new values and thereafter returns to act 1072. If the answer is "yes" in act 1081 then the controller goes to act 1083. In act 1083, the controller calculates new values for the Frequency and/or Duty Cycle of the signal "Bias" as a function of the above-described error signal. In the example of proportional control:

$$\text{Frequency} = P2*(\text{Ref. Temperature} - \text{Measured Temperature})$$

$$\text{Duty Cycle} = P3*(\text{Ref. Temperature} - \text{Measured Temperature})$$

wherein P2 and P3 are also empirically determined. Next, the controller goes to act 1084 and checks if the new values for the Bias signal's frequency and/or duty cycle are at the maximum limit. If not at the maximum limit, the new values are implemented in act 1085. Thereafter (regardless of whether or not the new values are implemented), the controller returns to act 1072.

Although certain specific embodiments of a head (that has a concave shape when unpowered) have been discussed above in reference to FIGS. 9A and 9B, the same principle is applicable to a head (that has a flat shape when unpowered), formed in the conventional manner. Specifically, as illustrated in FIG. 11A, a head 1100 has a surface 1101 that is flat when the head is powered down, and when the head is powered up the head expands to attain the surface 1102 in the normal manner.

Such a head 1100 also benefits from use of a center-tapped write transducer of the type described above, e.g. because the same profile 1102 is maintained regardless of whether or not a write operation is performed. Therefore, fly height of a head manufactured in the conventional manner (i.e. without being powered up) can also be maintained in the manner described above.

Furthermore, although use of a center-tapped write transducer has been described above in case of certain embodiments, other embodiments may implement a heating element differently. For example a dummy element may be located adjacent to the write transducer, but electrically isolated from the write transducer. Such a dummy element may (or may not depending on the embodiment) have been used during fabrication of the head. Moreover, such a dummy element is optional and need not be used in some embodiments, e.g. as illustrated in FIGS. 9A and 9B.

Figure 11A:
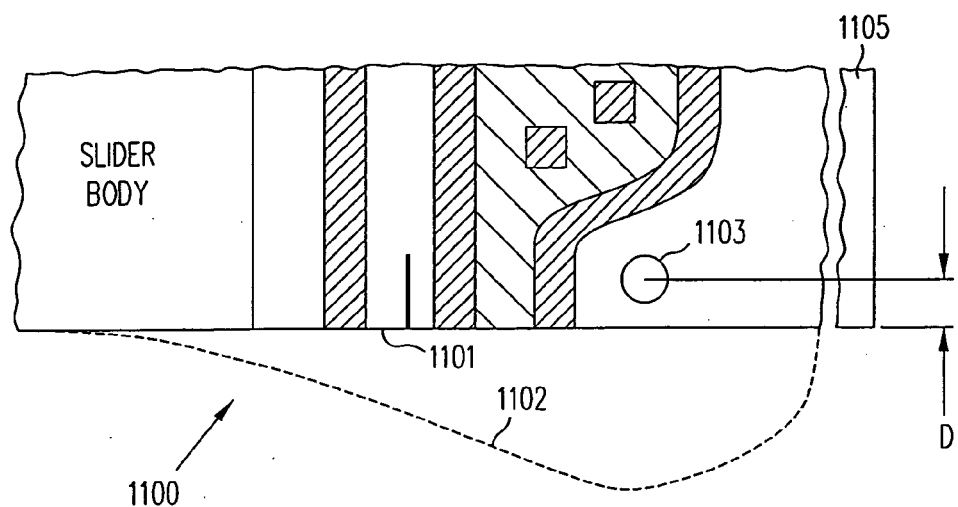
FIGS. 11A–11D illustrate, in cross-sectional diagrams, various embodiments that implement a heating element by use of one or more dummy elements.

As illustrated in FIG. 11A, a heating element of some embodiments is implemented as a resistor 1103 which is formed as a dummy element in head 1100. Resistor 1103 is configured to cause head 1100 to expand to the same surface 1102 that is attained when the write transducer is powered up. Use of resistor 1103 as the heating element requires head 1100 to have two additional terminals instead of just one additional terminal required by a center tapped write transducer.

Depending on the configuration of the head, a resistor 1103 that is used for heating (instead of or in addition to the write transducer) 1107 (FIG. 11A) may be located between write transducer 1107 and passivation layer 1105. Such a dummy element is used as a heating element of certain embodiments, during normal operations in a drive (which is instead of or in addition to its use during manufacture) as described above (i.e. is coupled to a controller that supplies a current that is selected to cause the head to achieve a predetermined shape). Note that such a dummy element may be formed of any material that is known to have a high resistance to electromigration, such as Tungsten. A dummy element of the type described herein can also be formed in a manner similar or identical to a resistive heater of the type described in U.S. Pat. No. 6,493,183 and this patent is incorporated by reference herein in its entirety.

The specific location of resistor 1103, e.g. at a distance D from an air bearing surface 1101 of head 1100, may be initially determined analytically and/or by modeling. Thereafter, in some embodiments, a batch of heads 1100 is manufactured, with resistor 1103 in each head being located at a slightly different position which is close to the position for resistor 1103 determined analytically.

Thereafter, tests are performed to find a head that expands up to the same surface 1102, regardless of performance of a write operation. On finding such an ideal head, the location of resistor 1103 in the ideal head is used to manufacture heads for use in production of drives. To a limited extent, certain variations in the location of resistor 1103 (e.g. which may arise due to tolerances in manufacturing processes) are remedied by supplying an appropriately different amount of current to resistor 1103 during operation in a drive.

Note that although in several embodiments expansion of a head due to operation of a write transducer has been mimicked by use of a heating element, other embodiments use such a heating element to mimic the head expansion due to operation of a read transducer. For example, a head 1110 (FIG. 11B) having a flat surface 1111 before being powered up has a surface 1112 when a read transducer is powered up. Head 1110 includes a dummy element 1113 which is used to implement a heating element when a read operation is not being performed, so that head 1110 continues to have the expanded surface 1112 even when the read transducer is powered off. Dummy element 1113 is physically located between the read transducer and the body of the slider, and may be formed of a resistor.

Figure 11B:
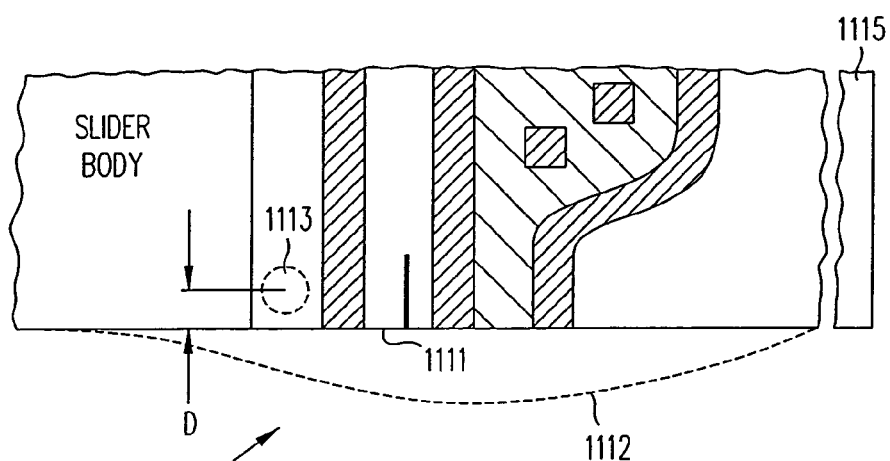
Figure 11C:
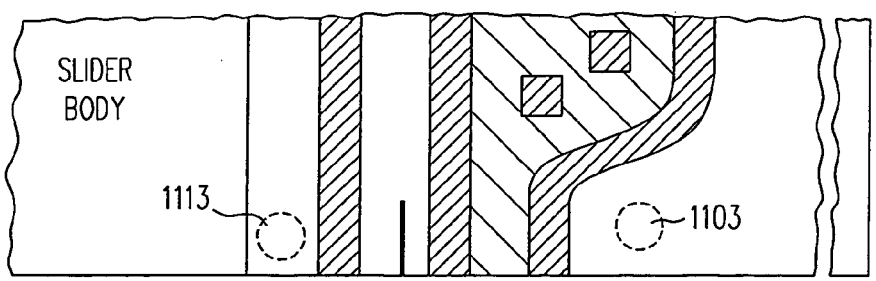
Figure 11D:
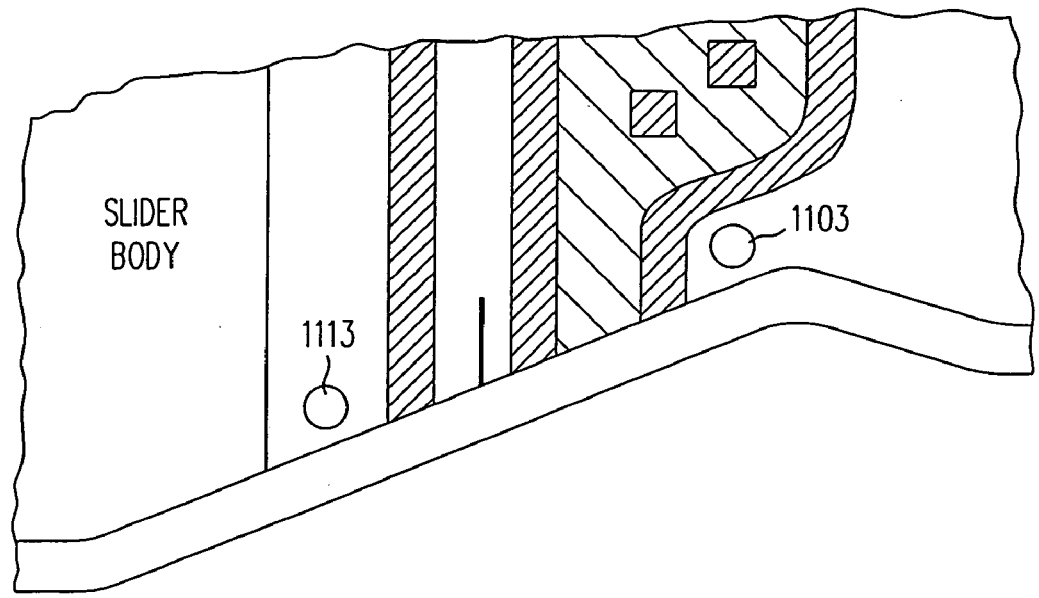

Such a head 1110 (FIG. 11B) may use a center tapped write transducer to maintain an expansion that is attained during the write operation. However, both kinds of dummy elements may also be used in a head as illustrated in FIG. 11C. Furthermore, although the heads illustrated in FIGS. 11A–11C are shown to have a flat surface when powered off, heads having a concave surface when powered off may also implement heating elements by use of either or both dummy elements 1113 and 1103, as illustrated in FIG. 11D.

Figure 12A:
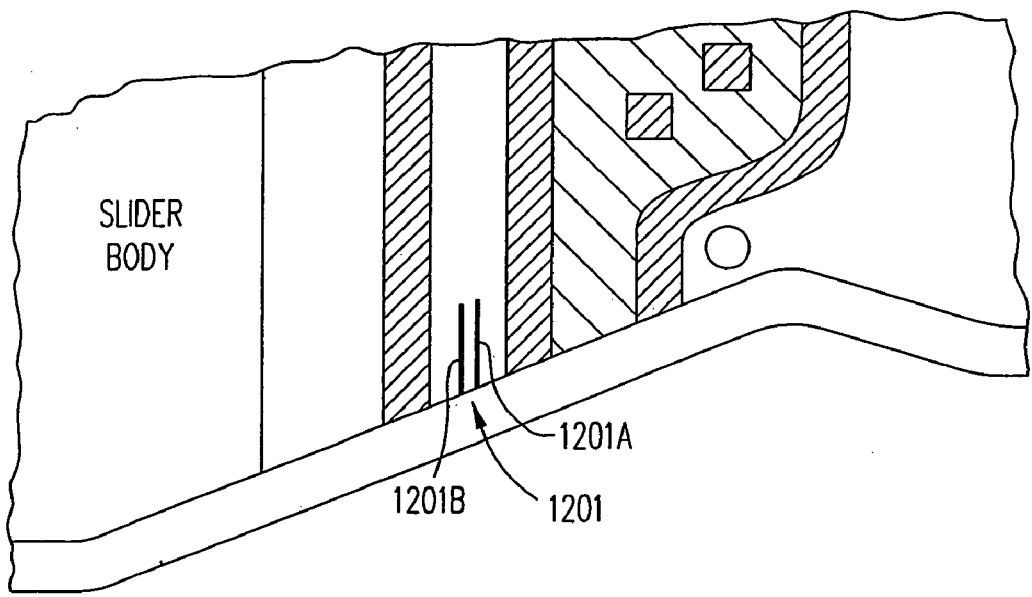
FIGS. 12A–12C illustrate various embodiments of a center-tapped read transducer.
Figure 12B:
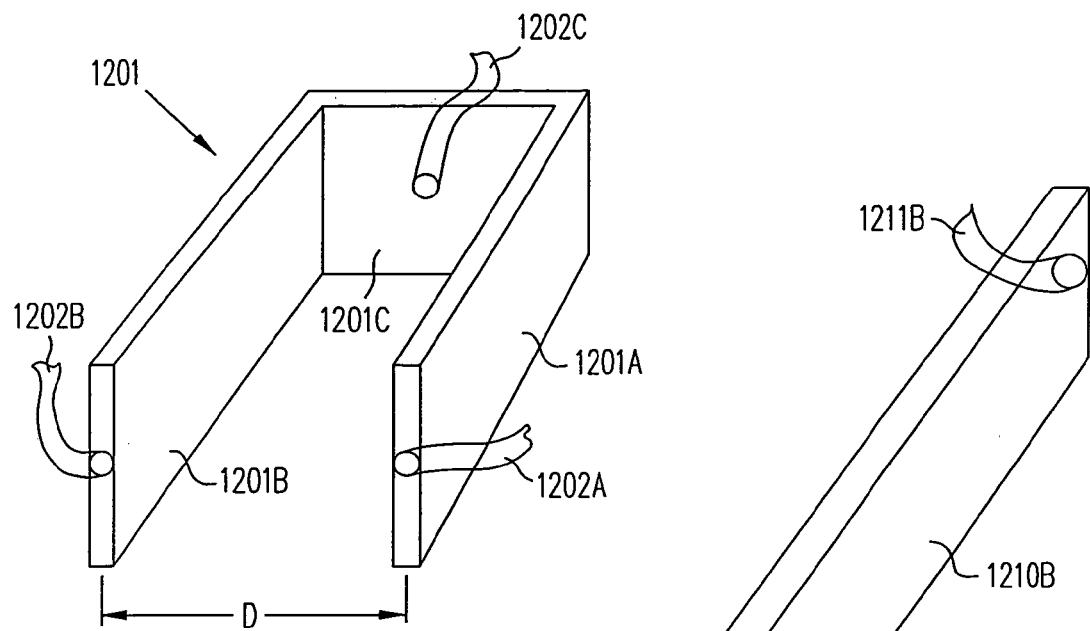

Certain embodiments use a center tapped read element 1201 (FIG. 12A) having two halves 1201A and 1201B that are formed parallel to one another. The two halves are connected to one another by a central region 1201C (FIG. 12B), so that read element 1201 has a shape of the letter "U". Region 1201C is located transverse to each of the two halves 1201A and 1201B, and forms the floor of the letter "U". Read element 1201 has three terminals that are respectively coupled to the wires 1202A, 1202B and 1202C. When performing a read operation, current passes through only one of the halves 1201A, e.g. between wires 1202A and 1202C, although this current is sufficient for the head to expand such that its air bearing surface becomes flat (or substantially flat), as illustrated by surface 902B in FIG. 9A.

When a read operation is not being performed, current passes through the other half 1201B, e.g. between wires 1202B and 1202C, and again the head expands to reach a flat air bearing surface. Note that the current applied when not performing a read operation may be slightly larger than the current applied during the read operation, to account for the distance D (FIG. 12B) between the two halves.

Figure 12C:
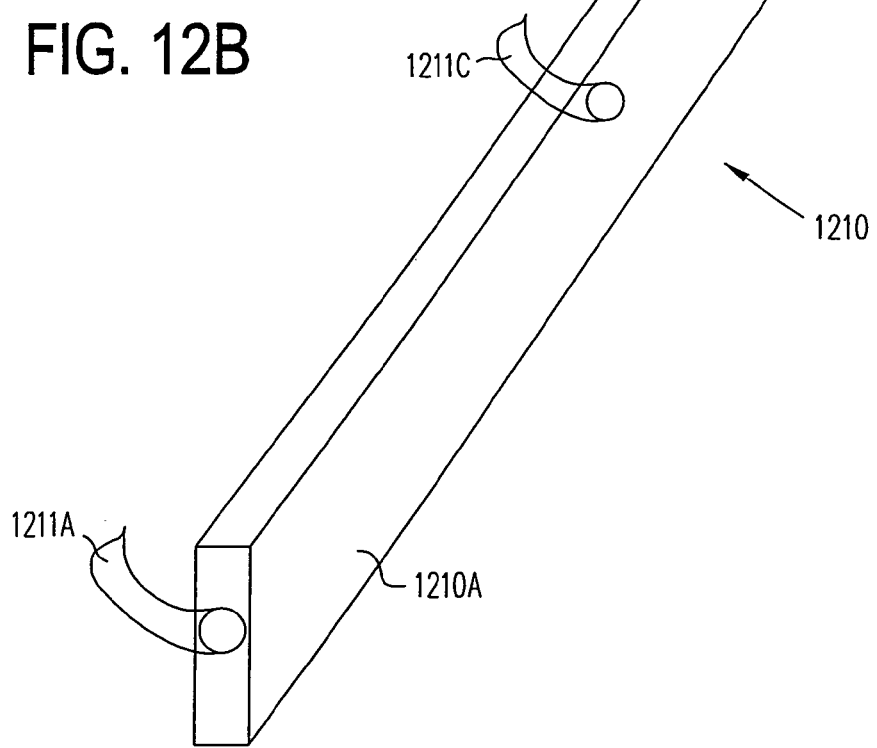

In still another embodiment, a read transducer 1210 (FIG. 12C) is made flat but has a center tap coupled to a wire 1211C. The center tap is located equidistant from the two ends at which are coupled the two wires 1211A and 1211B. In this embodiment, the two halves 1210A and 1210B of read transducer 1210 are formed in-line with (and hence coplanar with) one another. Read transducer 1210 is used in the manner described above in reference to read transducer 1201 (FIG. 12B). Note however, that heat generated in read transducer 1210 is also distributed different from heat distribution during the read operation. Read transducer 1210 provides an inferior mimicry of heat distribution and is therefore less likely to achieve a flat surface when not performing the read operation, as compared to read transducer 1201.

Figures 12D, 12E:
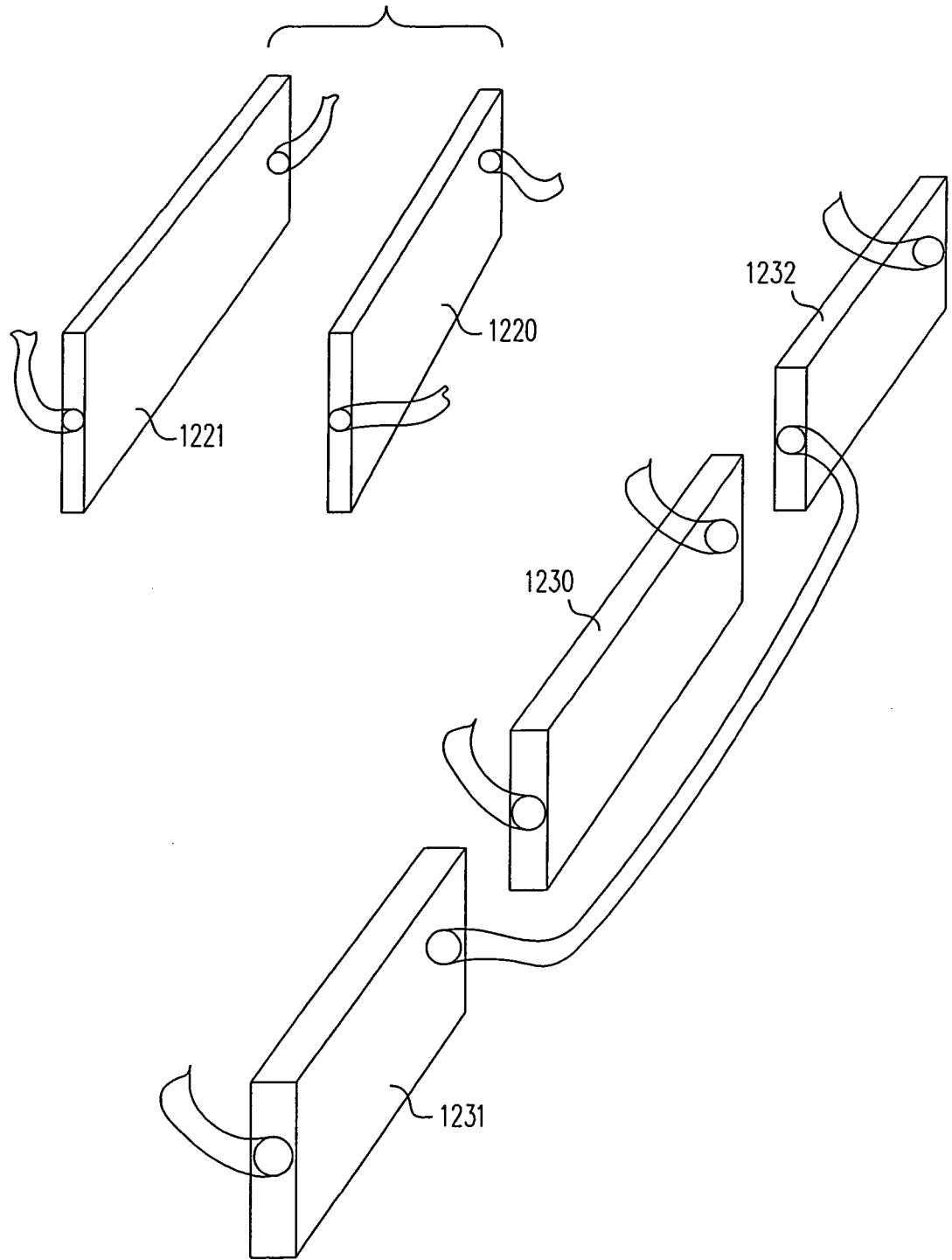
FIGS. 12D and 12E illustrate certain embodiments of a dummy elements that are formed either parallel to or in-line with a read transducer.

Furthermore, depending on the embodiment, a dummy element 1221 (FIG. 12D) can be formed parallel to a read transducer 1220. Also depending on the embodiment, two dummy elements 1231 and 1232 (FIG. 12E) can also be formed in-line with (and hence coplanar with) read transducer 1230. In such embodiments, dummy elements 1221, 1231 and 1232 all implement a heating element, for use in generating heat in the head when not performing a read operation. Such a dummy element may be formed by photolithography at the same time as a read transducer, and may be formed of any material that is not subject to electron migration, for example, tungsten.

In a manner similar to the coplanarity of dummy element 1221 with the related read transducer 1220, in other embodiments a dummy element may be made coplanar with the write transducer. Note that several embodiments may have two or more dummy elements and the different dummy elements may be in the two or more of the just-described locations. In some embodiments, the dummy element has a resistance in the range of 10% more or less than a resistance of the read transducer. In several embodiments, a dummy element is formed by photolithography simultaneously with the read transducer and the write transducer.

Figure 13A:
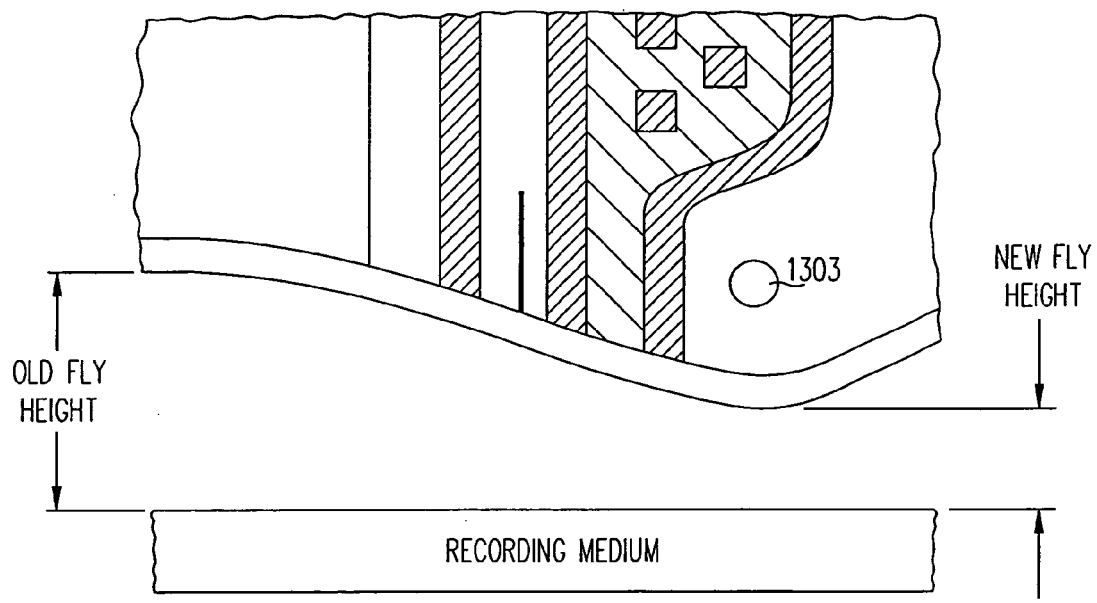
FIGS. 13A and 13B illustrate, in cross-sectional diagrams, exaggerated shapes of a head that are attained for performance of specific operations: a write operation and a read operation respectively.

Although the above description refers to supplying fixed power to a head 610 regardless of write operation, it will be apparent to the skilled artisan, in view of this disclosure that the power being supplied may be changed for other reasons. An amount of heat significantly greater than the amount needed to reach a flat shape may be generated within the head during a write operation (e.g. by passing a larger current through the write transducer), so as to cause the head to bulge beyond the flat shape. Such an exaggerated shape of the head (see FIG. 13A) reduces fly height during the write operation. The fly height returns to normal when the write operation is completed.

In an alternative embodiment, the current to the write transducer remains in an amount appropriate for the write operation, but a dummy element 1303 (FIG. 13A) is used to dissipate additional heat during the write operation, so as to cause the head to have an exaggerated shape, and thereby to reduce the fly height.

In a similar manner, when performing a read operation, the head can be heated until it has an exaggerated shape that reduces the fly height. Specifically, in some embodiments, either or both dummy elements 1313 and 1303 are used to dissipate sufficient heat for the head to have a flat air bearing surface, and in addition heat is dissipated by read transducer 1301 (FIG. 13B) thereby to cause the head to have an exaggerated shape.

Figure 13B:
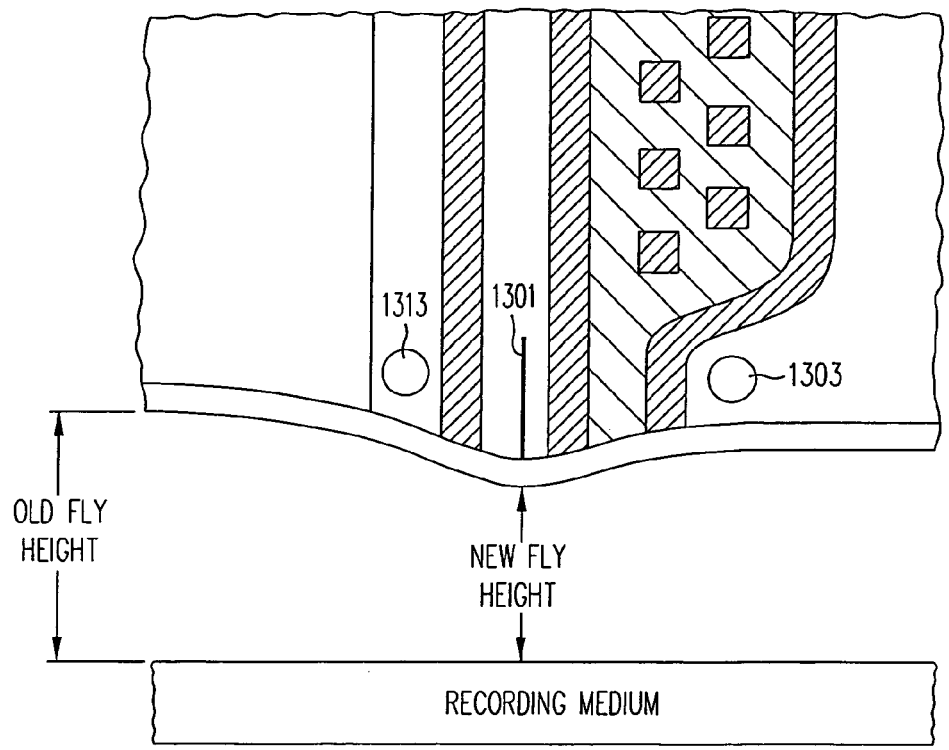

Note that the shape of the head in FIG. 13B, although exaggerated beyond the flat shape is different from the exaggerated shape attained during a write operation. Specifically, in FIG. 13B, the new fly height is smallest in the region where the read transducer 1301 is located, thereby to ensure maximum effectiveness in performance of the read operation by transducer 1301. Similarly, in FIG. 13A, the new fly height is smallest in the region where the write transducer is located, also for a similar reason.

Several embodiments adjust the heat generated in a head, based on the ambient temperature. For example, as the temperature in a warehouse changes from 55° F. at night to 85° F. during mid day, the drive itself under goes changes in temperature. To compensate for such changes, a preamplifier may be designed to inversely vary the power being supplied as a function of ambient temperature within the drive. When designed in this manner, the preamplifier decreases the power supplied as the ambient temperature rises, so as to ensure that the head remains at a temperature that is preset at the factory.

In one embodiment, the preamplifier senses the head temperature by monitoring the readback signal obtained from the read transducer (e.g. by looking up a table of data that experimentally correlates the readback signal to the head temperature). In some embodiments, the preamplifier supplies power to the head so as to maintain the head at a predetermined temperature (e.g. 85° F.) or within a small range around the predetermined temperature (e.g.+/−3° F. around 85° F.) regardless of the ambient temperature and also regardless of whether or not a write operation is being performed. Note that certain embodiments may operate the heating element part of the time that the write element is in operation, e.g. to raise the temperature of the head beyond the temperature that the head would have if only the write element is powered up.

Figure 14:
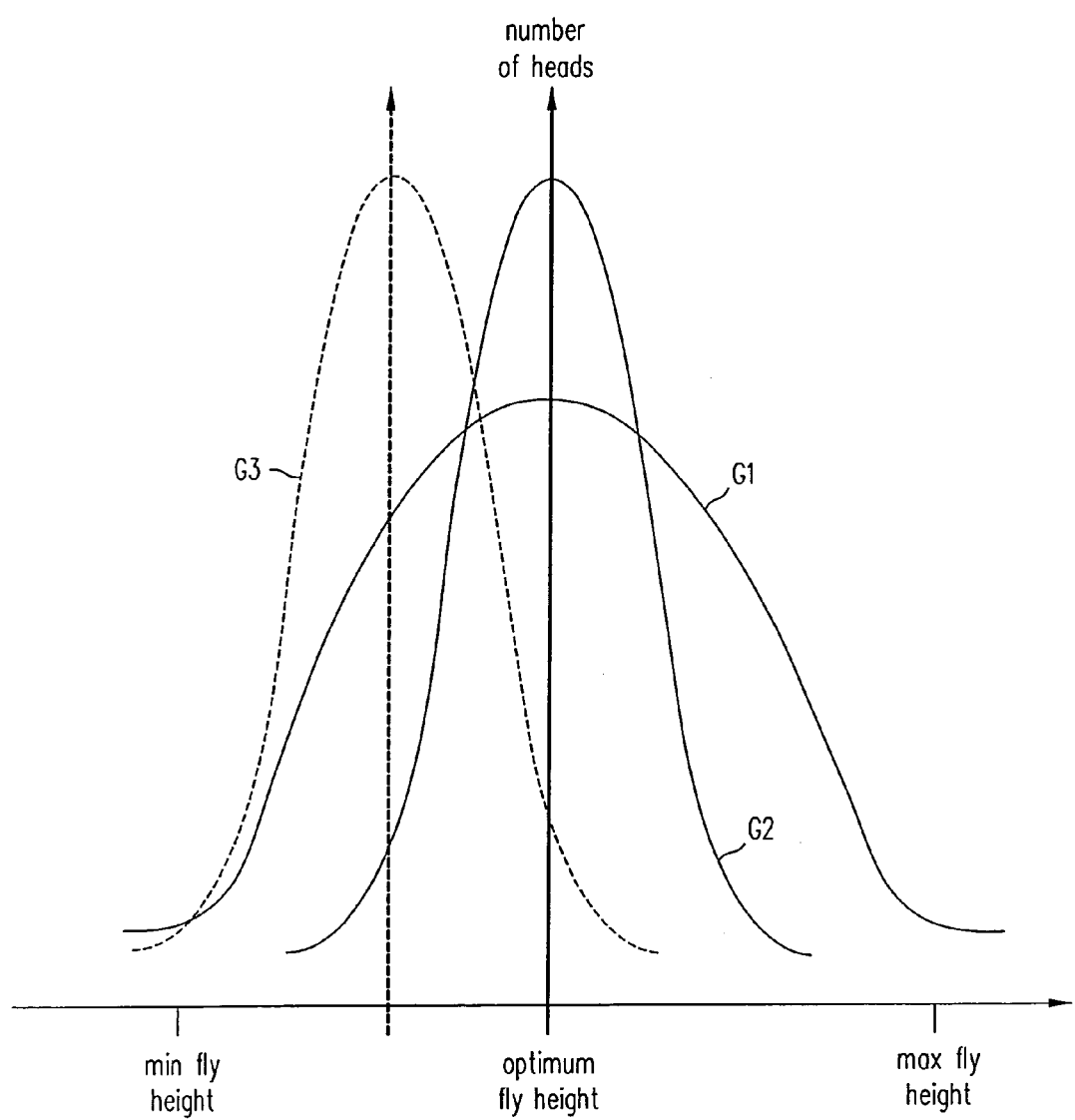
FIG. 14 illustrates, in a graph, curves G1 and G2 which indicate a distribution of the number of heads as a function of fly height, with and without generating heat within each head to maintain its fly height; and curve G3 illustrates use of a reduced fly height in certain embodiments, that maintain a head's profile by generating heat therein.

Actively adjusting a head's temperature and hence its shape causes a normal distribution of heads as a function of fly height as illustrated by graph G1 (FIG. 14), to become narrower and taller as illustrated by graph G2. Such a narrower and taller graph G2 allows the operational fly height (at which all heads are designed to operate) to be reduced as illustrated by graph G3. The reduced operational fly height in turn results in closer spacing of the magnetic signals being recorded on the recording medium, which in turn increases the amount of information that can be recorded in a recording medium.

Numerous modifications and adaptations of the embodiments described herein will be apparent to the skilled artisan in view of this disclosure. In one example, a slider has no temperature dependence of fly height and has no head current compensation vs drive temperature. In this case, head temperature is maintained constant vs head use mode as well as vs drive temperature. Specifically, the head heating current (and/or voltage) sources are adjusted to maintain a constant head temperature by matching the heat dissipation in the head while writing, while reading or while inoperative. The constant head temperature that is maintained is selected to be below a maximum allowed head temperature, to prevent burning out of the head. In this case one would not need to measure drive temperature separately. Feedback from the MR head sensor temperature is sufficient to control the profile (and therefore fly height) of this type of head.

In a more complicated example, a slider's fly height decreases with increasing temperature, as can happen via changes of slider crown induced by the differential thermal expansion of slider body and suspension. In this case one may want to compensate for this effect by inducing positive pole tip protrusion at the lower temperature to maintain constant pole tip-to-disk spacing. In such case one a specific head temperature vs drive temperature profile is achieved via the heating current (and/or voltage) sources powering the write transducer. Even with no compensation of write currents or sense currents vs temperature, some heating current may be applied at all times, partly to mimic the heating caused by write or read head operation while the head is not "powered" and partly to compensate for variance of the current drive temperature from the design. Having knowledge of the head as well as drive temperatures enables attainment of the desired goal for this case.

A most complicated example, but one that is practical, also compensates the write and sense currents vs drive temperature while doing everything else above. In all three examples that have been just described, the write current as well as heating current could be further adjusted in part, on the basis of the recording performance of each head, or on the basis of a priori knowledge of fly height for each slider, to compensate for any interhead variances of the type illustrated in FIG. 14.

In this manner, several embodiments of the type described herein allow for attainment of head fly height control for all heads vs head temperature (or vs drive temperature). Such embodiments achieve as small as possible head-to-disk spacing without any reliability exposures, provide as narrow as possible variance of this spacing vs. all drive use conditions for any head, and minimize variance of this spacing among heads. Note that these goals are being achieved in a regime where head pole tip protrusion is a significant part (up to 100% or more) of the head-to-disk spacing budget.

Embodiments that use a center tapped write coil have an added advantage as follows: if a 10 turn unitary coil is used then inductance is proportional to $10^2$ whereas when two 5 turn halves are used then the inductance is proportional to $5^2$ which is ¼ of the unitary turn's inductance. Such lowering of the inductance has the advantage of improving the rise time of the current flowing through the write coil.

Several such embodiments are based on the following assumptions. Adaptive setting of write head current is performed for each head-disk pair, possibly for every zone on a disk, as is well known in the art. Adaptive setting of read head sense (bias current) is performed for each head, as is well known in the art. Both currents $I_{write}$ and $I_{read}$ are compensated for drive ambient temperature as described in, for example the following US Patents, each of which is incorporated by reference herein in its entirety: U.S. Pat. Nos. 6,188,531, 5,408,465, and 5,978,163.

Several such embodiments are based on the following ingredients. A write head with a center tapped coil, use of MR read sensor as a head temperature sensor, and use of a second temperature sensor to sense drive temperature. The second temperature sensor indirectly tracks drive ambient temperature. This is used to adjust write or sense current vs. drive temperature. Also used in such embodiments is a head powered to product use conditions during lapping (as described above in reference to FIGS. 3A–3D), which minimizes any starting head recession or protrusion.

Such embodiments further use a preamplifier capable of providing multiple currents or voltages, as pairs, to the center tapped write head, in addition to supplying the bias current or voltage to the MR read sensor. The amplitude of each pair is adjusted in unison. The preamplifier measures the change of D.C. resistance of the MR sensor to measure head temperature via the thermistive properties of this sensor. The preamplifier also posses one or more adaptive functions as currently practiced in conventional drives.

Such embodiments also use multiple current sources for the center tapped head to, as a minimum, provide in-phase currents for writing, as well as out-of-phase currents for head heating (maintaining head temperature at the desired level) while the head is reading or otherwise not doing a write operation.

Such embodiments may further use knowledge of the flying characteristics of the slider vs drive temperature, preferably but not always flat and knowledge of head pole tip recession/protrusion vs head (MR sensor) temperature.

Moreover, in certain embodiments of the head, two terminals at the two ends of a write transducer are connected to an external circuit (called "preamplifier") that provides power to the head, and a terminal at the center of the write transducer is connected to a source of the ground reference voltage.

Furthermore, as would be apparent to the skilled artisan, the bimodal manner in which a write transducer is used can also be applied to a read transducer. Specifically, a current is applied to a read transducer in the normal manner when performing a read operation, and the same (or similar) current is still applied to the read transducer even when a read operation is not being performed, so as to ensure that the head maintains the same shape regardless of whether or not a read operation is being performed. In such an embodiment, when not performing a read operation, the signal from the read transducer is ignored.

Numerous such modifications and adaptations of the embodiments described herein are encompassed by the attached claims.

What is claimed is:

1. A storage device, comprising:
    a write transducer having a first terminal, a center tap and a second terminal; and
    a preamplifier comprising a first current source coupled between the first terminal and the center tap of the write transducer, the first current source being coupled to a source of a signal to be recorded and a second current source coupled between the center tap and the second terminal, the second current source being coupled to a switch to receive one of said signal and an inverted form of said signal.

2. The storage device of claim 1 wherein:
    the preamplifier supplies power to the write transducer regardless of whether or not a write operation is being performed.

3. The storage device of claim 1 wherein:

during a first period of time while the storage device is powered up, the preamplifier supplies power to the write transducer and a magnetic flux is generated by the write transducer to perform a write operation;

during a second period of time while the storage device is powered up, no magnetic flux is generated by the write transducer although the write transducer receives power from the preamplifier.

4. The storage device of claim 3 wherein:

power supplied to the write transducer by the preamplifier during the first period is same as power supplied by the preamplifier to the write transducer during the second period.

5. The storage device of claim 3 wherein:

the write transducer generates heat at an identical rate, regardless of whether or not the write operation is being performed.

6. The storage device of claim 1 wherein:

the write transducer is located in a head; and during normal operation of the storage device, the head is maintained within a predetermined temperature range, regardless of whether or not a write operation is being performed by the write transducer.

7. The storage device of claim 1 wherein:

the write transducer is located in a head; and the head comprises a read transducer adjacent to the write transducer.

8. The storage device of claim 7 wherein:

the read transducer has two portions located parallel to one another.

* * * * *